US010021614B2

(12) United States Patent
Ross et al.

(10) Patent No.: US 10,021,614 B2
(45) Date of Patent: *Jul. 10, 2018

(54) OPTIMIZING COMMUNICATION FOR AUTONOMOUS VEHICLES

(71) Applicant: Uber Technologies, Inc., San Francisco, CA (US)

(72) Inventors: William Ross, Pittsburgh, PA (US); Michael Aitken, Pittsburgh, PA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/420,932

(22) Filed: Jan. 31, 2017

(65) Prior Publication Data
US 2017/0164257 A1 Jun. 8, 2017

Related U.S. Application Data

(63) Continuation of application No. 14/962,847, filed on Dec. 8, 2015, now Pat. No. 9,603,158.

(51) Int. Cl.
H04W 36/14 (2009.01)
H04W 4/04 (2009.01)
(Continued)

(52) U.S. Cl.
CPC ........... H04W 36/14 (2013.01); H04W 4/008 (2013.01); H04W 4/046 (2013.01); H04W 4/80 (2018.02);
(Continued)

(58) Field of Classification Search
USPC .................................. 370/330, 232
See application file for complete search history.

(56) References Cited

U.S. PATENT DOCUMENTS 6,339,745 B1   1/2002   Novik
6,424,638 B1   7/2002   Ray
(Continued)

FOREIGN PATENT DOCUMENTS

EP    2709207    3/2014

OTHER PUBLICATIONS

Jennifer J.N.Liu, et al., "Mobile Ad Hoc Networking with a View of 4G Wireless: Imperatives and Challenges", In: Mobie Ad Hoc Networking, 2004 Institute of Electrical and Electronics Engineers, Inc. Jan. 28, 2005, Section 1.2.
(Continued)

Primary Examiner — Warner Wong
(74) Attorney, Agent, or Firm — Mahamedi IP Law LLP

(57) ABSTRACT

A system for managing network connections for AVs can store a spectrum heat map that indicates network coverage strength for networks throughout a given region. The system can identify a travel route for a selected AV. Using the spectrum heat map, the system can determine a connection schedule for the selected AV. The connection schedule can indicate location points along the travel route at which the selected AV is to switch from previous network connections to succeeding network connections. The system may then transmit the connection schedule to the selected AV to enable the selected AV to switch network connections at the location points along the travel route.

17 Claims, 15 Drawing Sheets

(51) Int. Cl.
  *H04W 4/00* (2018.01)
  *H04W 16/18* (2009.01)
  *H04W 24/08* (2009.01)
  *H04W 36/30* (2009.01)
  *H04W 48/16* (2009.01)
  *H04W 4/80* (2018.01)

(52) U.S. Cl.
  CPC ........... *H04W 16/18* (2013.01); *H04W 24/08* (2013.01); *H04W 36/30* (2013.01); *H04W 48/16* (2013.01)

(56) References Cited

U.S. PATENT DOCUMENTS

| | | |
|---|---|---|
| 7,095,318 B1 | 8/2006 | Bekhor |
| 7,889,065 B2 | 2/2011 | Smith |
| 7,904,092 B2 | 3/2011 | Hart |
| 8,155,081 B1 * | 4/2012 | Mater .................. H04W 4/04 370/254 |
| 8,417,239 B1 | 4/2013 | DeCusatis |
| 8,437,890 B2 | 5/2013 | Anderson |
| 8,452,310 B1 | 5/2013 | Orlik |
| 8,676,431 B1 | 3/2014 | Mariet |
| 8,818,719 B1 | 8/2014 | Thanayankizil |
| 8,880,273 B1 | 11/2014 | Chatham |
| 8,954,252 B1 | 2/2015 | Urmson |
| 9,014,905 B1 | 4/2015 | Whitehill |
| 9,025,463 B1 | 5/2015 | Mankee |
| 9,057,620 B2 * | 6/2015 | Dave .................. G01C 21/3461 |
| 9,087,348 B2 | 7/2015 | Petrucci |
| 9,107,132 B2 * | 8/2015 | Kowshik ............. H04W 36/245 |
| 9,432,929 B1 | 8/2016 | Ross |
| 9,441,975 B2 * | 9/2016 | Pylappan ................ G06T 11/00 |
| 9,467,832 B2 | 10/2016 | Haney |
| 9,475,422 B2 | 10/2016 | Hillis |
| 9,481,367 B1 | 11/2016 | Gordon |
| 9,483,948 B1 | 11/2016 | Gordon |
| 9,488,490 B2 | 11/2016 | Chintakindi |
| 9,537,561 B1 | 1/2017 | Kotecha |
| 9,557,183 B1 | 1/2017 | Ross |
| 9,565,625 B1 | 2/2017 | MacNeille |
| 9,603,158 B1 | 3/2017 | Ross |
| 2002/0029108 A1 | 3/2002 | Liu |
| 2003/0073442 A1 | 4/2003 | Fattouch |
| 2004/0029558 A1 | 2/2004 | Liu |
| 2004/0157549 A1 | 8/2004 | Dold |
| 2005/0090226 A1 | 4/2005 | Wolf |
| 2005/0168353 A1 | 8/2005 | Dement |
| 2005/0171654 A1 | 8/2005 | Nichols |
| 2006/0059024 A1 | 3/2006 | Bailey |
| 2006/0189353 A1 | 8/2006 | Fujishima |
| 2006/0229070 A1 | 10/2006 | de La Chapelle |
| 2006/0229103 A1 | 10/2006 | Monk |
| 2006/0229104 A1 | 10/2006 | de La Chapelle |
| 2007/0077945 A1 | 4/2007 | Sheynblat |
| 2007/0178911 A1 * | 8/2007 | Baumeister ............. G01S 1/022 455/456.1 |
| 2008/0097688 A1 | 4/2008 | Tashev |
| 2008/0186882 A1 | 8/2008 | Scherzer |
| 2008/0242305 A1 * | 10/2008 | Kahlert .................. H04W 36/32 455/440 |
| 2009/0005097 A1 | 1/2009 | Shaffer |
| 2009/0109061 A1 | 4/2009 | McNew et al. |
| 2009/0196234 A1 | 8/2009 | Greene |
| 2009/0196258 A1 | 8/2009 | Escobar Sanz |
| 2009/0254254 A1 | 10/2009 | Wang |
| 2010/0082193 A1 | 4/2010 | Chiappetta |
| 2010/0151865 A1 | 6/2010 | Camp, Jr. |
| 2010/0290359 A1 | 11/2010 | Dewey |
| 2011/0128161 A1 | 6/2011 | Bae et al. |
| 2011/0171960 A1 | 7/2011 | Hershey |
| 2011/0227757 A1 | 9/2011 | Chen |
| 2013/0006674 A1 | 1/2013 | Bowne |
| 2013/0073327 A1 | 3/2013 | Edelberg |
| 2013/0115956 A1 * | 5/2013 | Ewert .................. H04W 48/08 455/437 |
| 2013/0122934 A1 | 5/2013 | Branch |
| 2013/0142035 A1 | 6/2013 | Sunderrajan |
| 2013/0182575 A1 | 7/2013 | McLean |
| 2013/0184985 A1 | 7/2013 | Bollars |
| 2013/0218469 A1 | 8/2013 | Turton |
| 2013/0225229 A1 | 8/2013 | Al-Shalash |
| 2013/0279349 A1 | 10/2013 | Pandey |
| 2013/0322388 A1 | 12/2013 | Ahn |
| 2014/0087739 A1 * | 3/2014 | Weaver .................. H04W 16/18 455/441 |
| 2014/0180501 A1 | 6/2014 | Kyllmann |
| 2014/0188377 A1 | 7/2014 | Bonawitz |
| 2014/0297116 A1 | 10/2014 | Anderson |
| 2014/0306833 A1 | 10/2014 | Ricci |
| 2014/0309789 A1 | 10/2014 | Ricci |
| 2014/0309814 A1 | 10/2014 | Ricci |
| 2014/0309864 A1 | 10/2014 | Ricci |
| 2014/0355476 A1 | 12/2014 | Anderson |
| 2015/0023256 A1 | 1/2015 | Liu |
| 2015/0063144 A1 | 3/2015 | Kozat |
| 2015/0081212 A1 | 3/2015 | Mitchell |
| 2015/0133167 A1 | 5/2015 | Edge |
| 2015/0149078 A1 | 5/2015 | Profous |
| 2015/0178953 A1 | 6/2015 | Gao |
| 2015/0181414 A1 | 6/2015 | Bretscher |
| 2015/0215738 A1 | 7/2015 | Frusina |
| 2015/0222372 A1 * | 8/2015 | Le Grand ............. H04W 24/04 455/226.2 |
| 2015/0264519 A1 | 9/2015 | Mirzaei |
| 2015/0281906 A1 | 10/2015 | Tseng |
| 2015/0308841 A1 | 10/2015 | Matsunaga |
| 2015/0331111 A1 | 11/2015 | Newman |
| 2015/0339928 A1 | 11/2015 | Ramanujam |
| 2016/0006723 A1 | 1/2016 | Wilson |
| 2016/0073117 A1 | 3/2016 | Grasmug |
| 2016/0157254 A1 | 6/2016 | Novlan |
| 2016/0282468 A1 | 9/2016 | Gruver |
| 2016/0301698 A1 | 10/2016 | Katara |
| 2016/0323356 A1 | 11/2016 | Ribeiro |
| 2016/0337935 A1 | 11/2016 | Patil |
| 2017/0120804 A1 | 5/2017 | Kentley |
| 2017/0132334 A1 | 5/2017 | Levinson |
| 2017/0268888 A1 * | 9/2017 | Blumenberg .......... G01C 21/32 |
| 2017/0371338 A1 | 12/2017 | Kamata |

OTHER PUBLICATIONS

ISR and WO issued in PCT/US2016/065656 dated Apr. 11, 2016.
ISR and WW issued in PCT/US2016/0068563 dated Apr. 17, 2016.

* cited by examiner

US 10,021,614 B2

OPTIMIZING COMMUNICATION FOR AUTONOMOUS VEHICLES

RELATED APPLICATION

This application is a continuation of U.S. patent application Ser. No. 14/962,847, entitled "Optimizing Communication For Automated Vehicles," filed on Dec. 8, 2015; the aforementioned application being hereby incorporated by reference in its entirety.

BACKGROUND

Autonomous vehicles (AVs) may require continuous sensor data processing using an on-board data processing system. Communications between multiple AVs (AV2AV), and between the AVs and a backend system (e.g., a fleet management system), may cause unacceptable transmission delays when the backend system is managing multiple AVs (e.g., a datacenter tracking and sending out AVs throughout a given region or city to facilitate transportation requests). For example, network latency can hinder fluidity in AV operations, thus negatively impacting the rollout of AV usage on public roads and highways.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
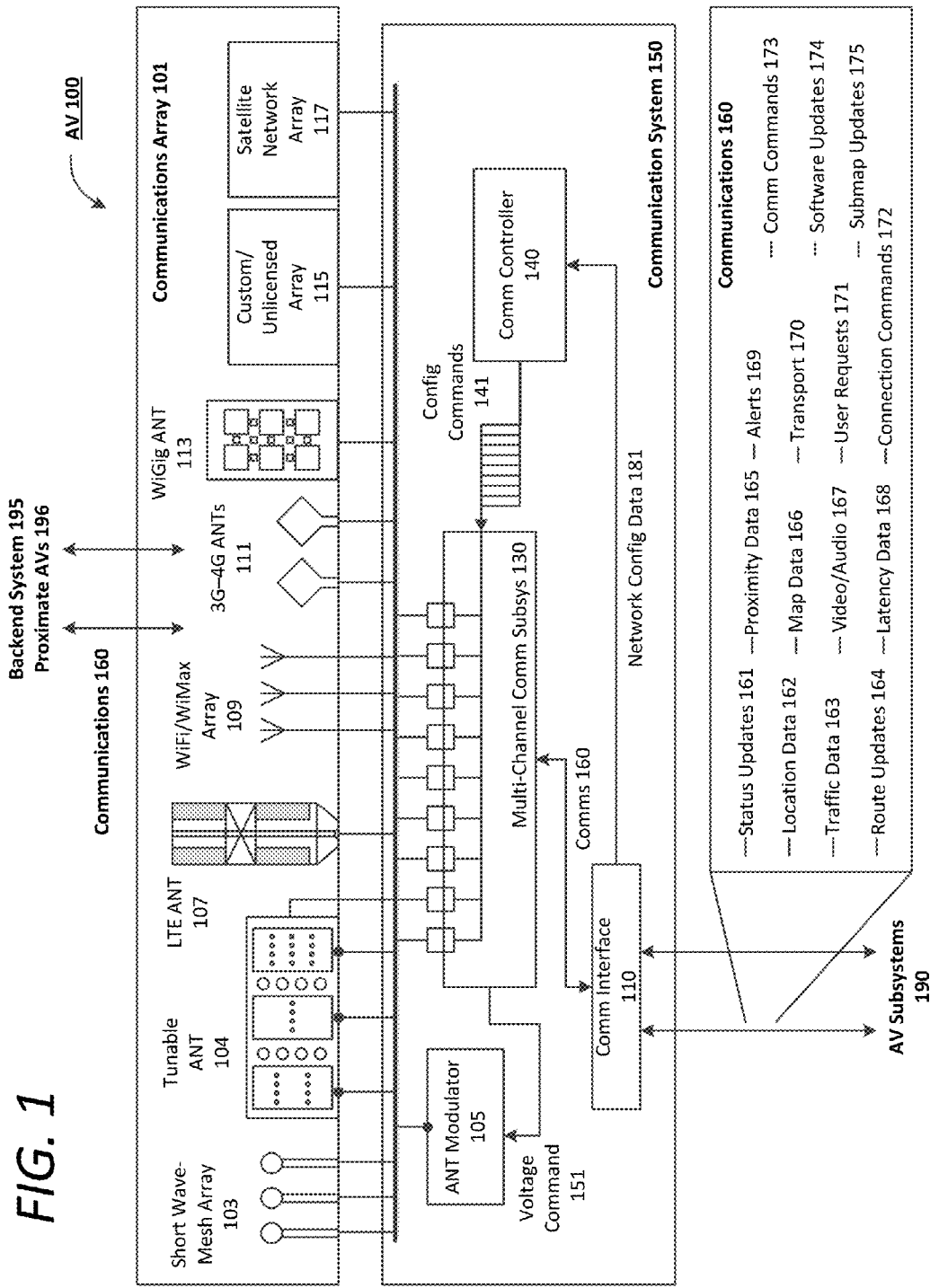
FIG. 1 is a block diagram illustrating an example communications array for an AV, according to examples described herein.

A backend system is provided to send out and coordinate routes for a fleet of AVs within a given region based on communication requirements. The backend system can receive pick-up requests from user devices executing a designated application to facilitate transportation for requesting users. Each pick-up request can include a pick-up location and a destination. The backend system can instruct and send out AVs to service the pick-up requests (e.g., provide a deliver or transport service, or a trip). For each pick-up request or trip, the backend system can perform an optimization operation to determine an optimal route for an AV to travel to the pick-up location (e.g., to pick up the user) and/or to travel to the destination (e.g., to drop off the user) by utilizing a network resource map comprising base station locations, available networks/network types, coverage areas, and bandwidth gradients (e.g., spectrum heat maps) for a plurality of communication protocols. The backend system may then transmit route data for the optimal route to the selected AV.

In some examples, the backend system can predict communication requirements for the selected AV between the pick-up location and the destination. For example, enhanced communications may be necessary when the AV travels through a crowded area of a city, or through high traffic areas. The backend system can determine the optimal route based on the results of the optimization operation, which can account for predicted communications requirements for the selected AV.

In certain aspects, the AV can include hardware, and/or a combination of executable software and hardware, to communicate with the backend system and other AVs using several communications protocols. Such protocols can include third generation (3G), fourth generation (4G), or long-term evolution (LTE) telecommunications technology. Additionally or alternatively, the protocols can include Wireless Gigabit Alliance (WiGig), WiMax, WiFi, dedicated short range communications (DSRC), mesh networking, and other like technologies. Utilizing network resource data provided by the network resource map, the backend system can dynamically transmit network configuration data to the selected AV to configure the AV's on-board communications system for optimal communications along the optimal route. The network configuration data can cause the selected AV to switch between a plurality of communication channels along the optimal route in order to optimize communications. Furthermore the network configuration data can comprise commands instructing the AV to communicate over multiple channels simultaneously. For example, the network configuration commands can instruct the AV to transmit and receive transmission acknowledgments (ACKs) on a more reliable channel than lower priority data, such as network latency updates.

In respective implementations, the backend system can identify certain locations along the optimal route that have limited network availability. In these situations, the backend system can manage routing for additional AVs in the fleet to establish mesh networks when respective AVs travel through these limited network areas. The backend system can target these network-limited areas and route selected AVs so that AVs traveling through these areas can continue to communicate with the backend system via the established mesh networks, which can be dynamically configured amongst proximate AVs. The routing of these AVs, which may also be routed to respective destinations, can be timed, routed, and rerouted in a manner such that the limited nature of network availability in these areas is sufficiently mitigated to provide reliable communications to "off-network" AVs.

In order to maintain up-to-date data for the network resource map, the backend system can collect network latency data from the fleet of AVs to update the network resource map. In many aspects, the backend system also collect cost data from the fleet of AVs, where the cost data indicates costs associated with connecting to communications networks throughout the given region. Thus, the optimal route may be determined based not only on base station locations, predicted communications requirements, mesh networking or limited availability areas, but also based on the cost data collected for network connectivity throughout the given region. Collection of the cost data and network latency data enables the backend system to continuously update a database with such data, and further map a number of optimal default routes between high traffic destinations throughout the given region based on the updated network latency data and the updated cost data. Accordingly, in certain implementations, the backend system can automatically send out AVs on the optimal default routes for pick-up requests that match the certain route endpoints.

Among other benefits, the examples described herein achieve a technical effect of optimizing communications between selected AVs and a backend system (e.g., a backend system) that manages communications with and between the AVs. The AVs can include communications capabilities for any number of communications protocols (e.g., 4G LTE, DSRC, WiMAX, 900 MHz ultra-high frequency (UHF) radio, etc.). The backend system can determine optimal routes for communications when AVs are sent out to respective destinations based on any number of the following: base station locations, network types, connectivity costs, mesh networking opportunities, road traffic, network latency, coverage areas, available bandwidth, and the like. The backend system can further transmit dynamic network configuration commands to configure the communications systems of the AVs to transmit and receive data using a particular communications protocol as the AVs travel along the calculated optimal routes.

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example communications array 101 for an AV 100, according to examples described herein. The communications array 101 can comprises any number of the arrays and antennas shown in FIG. 1. In some examples, the communications array 101 can include a single or multiple antennas to transmit and receive communications in accordance with multiple communication protocols. In variations, the communications array 101 can include multiple dedicated antennas for different communications protocols, such as 3G, 4G, LTE, DSRC, WiFi, WiGig, WiMax, and like protocols. In the example shown in FIG. 1, multiple dedicated antennas and arrays are shown for illustrative purposes. However, example communications arrays 101 described herein may include any number of antennas and/or one or more communications arrays shown and described with respect to FIG. 1. As such, the communications array 101 can be controlled and configured by a communication system 150 of the AV 100 and can communicate with a backend system 195 and other AVs 196 using any number of a selectable set of communications protocols shown and described.

In some examples, the communications array 101 can include short-wave communications array 103, such as a DSRC array, for short range communications. For example, the short range communications array 103 may be utilized by the AV 100 to establish a mesh network with one or more proximate AVs 196 in order to relay communications 160 through proximate AVs 196 to a base station network in order to maintain communication connectivity to the backend system 195. Other communications hardware may be included in the communications array 101 to establish mesh networks between AVs and to establish connectivity with different network types. For example, a WiFi and/or WiMax array 109, 3G or 4G antennas 111, and/or a 4G LTE antenna 107 can be included. The communications array 101 may further include a WiGig antenna 113, or dedicated arrays for custom or unlicensed channels 115. In some examples, the communications array 101 can also include a satellite network array 117 that can transmit and receive communications 160 via a global satellite Internet network.

In certain aspects, the communications array 101 can include a tunable antenna 104 that can be configured to communicate in multiple different frequencies and can be phase-adjusted, and gain pattern adjusted in order to maximize communication link quality. In such aspects, the communication system 150 can include a tunable antenna modulator 105 which can operate to adjust the frequency, phase, and/or gain pattern of the tunable antenna 104 based on available networks, base station locations, and the orientation of the AV 100. For example, a communications controller 140 of the communications system 150 can respond to network configuration commands 181 received from the backend system 195, and can generate voltage commands 151 to ultimately adjust the tunable antenna 104 to communicate over a specified channel indicated in the network configuration data 181.

Still referring to FIG. 1, the AV's 100 communication system 150 can be included as a component of an on-board data processing system that configures the communications array 101 to transmit and receive communications 160 based on network configuration data 181 received from the backend system 195, or relayed from one or more proximate AVs 196. In many aspects, the communication controller 140 can control a multi-channel communication subsystem 130 to configure the communications array 101 to transmit and receive data over one or multiple channels simultaneously. For example, the communications controller 140 can receive network configuration data 181 dynamically from the backend system 195, a proximate AV 196, or one or more AV subsystems 190. Based on the network configuration data 181, the communications controller 140 can generate configuration commands 141 to cause the multi-channel communications subsystem 130 to configure the communications array 101 accordingly.

Communications 160 received from the backend system 195 and proximate AVs 196 can be received by the multi-channel communication subsystem 130 and transmitted to the AV subsystems 190 via a communication interface 110. Communications 160 may also be transmitted via the multi-channel communications subsystem 130 and the communications array 101. As provided herein, such communications 160 transmitted from and received by the AV 100 can include status updates 161 of the AV 100, location data 162, traffic data 163, route updates 164, proximity data 165, map data 166, video and audio data 167, network latency data 168, various types of alerts 169, transport commands 170, user requests 171, network updates 172, communication commands 173, software updates 174, sub-map updates 175, and the like.

In many examples, the status updates 161 can be periodically transmitted from the AV 100 to the backend system 195. For example, a status update 161 may be automatically transmitted by the AV 100 when a status of the AV 100 has changed. The status updates 161 can include information relating to whether the AV 100 is available to service a pick-up request, a current fuel or power level, a current destination, service history, mileage, and the like.

Location data 162 may be transmitted by the AV 100 according to a particular protocol (e.g., transmission of a GPS location data packet every 3-5 seconds). Each location data transmission 162 can include data indicating a current location of the AV 100. The backend system 195 can utilize the location data 162 to, for example, manage routing of a fleet of AVs within a given region (e.g., a transportation arrangement service utilizing hundreds to thousands of AVs and spanning a city or a certain population). Traffic data 163 and map data 166 can be periodically provided or streamed to the AV 100 by the backend system 195, or a third party mapping resource, to enable the AV 100 to provide updates to passengers and potentially update a current route.

Additionally or alternatively, route updates 164 may be transmitted to the AV 100 in order to cause the AV 100 to alter a current route, or begin a new route to a destination. For example, the AV 100 may be servicing a pick-up request along an optimal route when the backend system 195 transmits a route update 164 to the AV 100 in order to form a mesh network with one or more proximate AVs 196 to maintain communication connectivity with the backend system 196. Proximity data 165 can be transmitted to the AV 100 indicating one or more proximate AVs 196 with which the AV 100 can create a mesh network. Additionally or alternatively, the proximity data 165 can indicate base station locations to enable the AV 100 to maintain network connectivity and perform handoffs to other base stations.

Video and audio data 167 can include interior video of the passenger(s), or streaming content over a connected network (e.g., a WiFi network). In some aspects, the AV 100 can include on-board WiFi (i.e., IEEE 802.11b channels) for the passenger(s) to connect to the Internet. Thus, the AV 100 can transmit and receive communications and data (e.g., Internet content) simultaneously over multiple channels by configuring the multi-channel communications subsystem 130 accordingly. For example, the user can configure a personal computer or mobile device to connect to the AV's 100 on-board WiFi, which can trigger the communications controller 140 to generate a configuration command 141 to switch on a WiFi module of the multi-channel communication subsystem 130 in order to provide Internet access to the passenger(s). As an addition or alternative, the AV 100 itself can include a touch-screen and a computing system that enables the passenger(s) to access the Internet.

Network latency data 168 can be communicated from the AV 100 to the backend system 195 in order to enable the backend system 195 to update a network resource map. Furthermore, cost data can also be transmitted to the backend system 195, where the cost data can indicate costs associated with connecting to each of the networks along a particular route. The latency data 168 and cost data can be received by the backend system 195 from any number of the AVs 100, 196 in the fleet, and can be utilized by the backend system 195 to continuously update the network resource map and network log data in order to calculate optimal routes based on both communication quality and communication costs.

In many aspects, the communications 160 can further include data indicating instantaneous network bandwidth. For example, the backend system 195 can receive localized instantaneous bandwidth information from various AVs traveling throughout a given region. As a dynamic process, the backend system 195 may then utilize this instantaneous data to generate and transmit communication system configuration data to applicable AVs throughout the given region in order to optimally configure their communication systems 150 accordingly. As such, these optimal configurations can enable the AV 100 to take advantage of readily available bandwidth while preemptively avoiding crowded networks.

Additionally or alternatively, the communications 160 can include data indicating one-way latencies and/or bandwidths from the AV 100 to the backend system 195 and/or the backend system 195 to the AV 100 to further optimize communication system 150 configurations. Thus, the backend system 195 or the AV 100 itself can generate configuration commands 141 dynamically to optimize the configurations of the communication system 150 for one-way data transmissions. Still further, in certain implementations, the communications 160 can include network jitter data indicating variations in the delay of received data packets. The backend system 195 can utilize this jitter data to, for example, identify bandwidth variation patterns and/or respond dynamically to the jitter data by optimally configuring the communication systems 150 of AVs traveling throughout the given region, as described herein.

Various alerts 169 can be transmitted and received by the AV 100. The alerts 169 can include information ranging from emergency communications, road accident or traffic alerts, construction alerts, road quality alerts, and the like. Furthermore, these alerts 169 can be prioritized by the AV 100 to be transmitted on a most reliable network by default.

Likewise, sub-map updates 175 can be detected and/or processed by the AV 100 and then transmitted to the backend system 195 to maintain up-to-date sub-maps for the given region. As an example, the AV 100 and proximate AVs 196 can utilize sub-maps to compare to sensor data in order to maintain situational and positional awareness. Constant data processing may be required by the AV 100 in order to maintain an awareness of other vehicles, roads, pedestrians and bicycles, traffic signals, road signs, etc. Furthermore, continuous localization is required for the AV 100 to determine a current location and orientation by mapping the sensor data, detected by a sensor array of the AV 100, to stored sub-maps previously recorded by other AVs or sensor vehicles. On occasion, the sub-maps can be updated to reflect software/hardware updates and road construction updates. Accordingly, certain AVs can include sensor arrays to provide sub-map updates 175 to the backend system 195, which can then transmit updated sub-maps to the other AVs in the fleet.

Furthermore, the AV 100 can receive transport commands 170 to direct the AV 100 to travel to a destination (e.g., a pick-up or drop-off location). For example, the AV 100 may be utilized for the delivery of commerce items and/or the transportation of passengers for any number of reasons. In certain implementations, the transport commands 170 can be generated by the backend system 195—as described below with respect to FIG. 3. Furthermore, the transport commands 170 can be processed by an on-board AV controller that operates the acceleration, braking, and maneuvering systems of the AV 100 in order to drive the AV 100 to respective instructed locations and destinations.

Additionally, the AV 100 can receive connection commands 172 from the backend system 195 that cause the AV 100 to establish connections with respective networks along an optimized route. The connection commands 172 can cause the AV 100 to connect with one or multiple networks at any given time, and communicate with the backend system 195 over any of the connected networks. Along these lines, the AV 100 can receive communication commands 173 from the backend system 195 indicating which particular connection to use when communicating different types of data. For example, the backend system 195 can prioritize certain types of data communications with the fleet of AVs (e.g., emergency communications or ACKs), and command the AV 100 to cache non-essential data (e.g., sub-map updates 175).

On occasion, the backend system 195 may be provided with upgrade data for transmission to the AV 100 (and the fleet of AVs). This upgrade data can include software updates 174 for the AV's 100 on-board computing and control systems. The software updates 174 can comprise patches to upgrade security or fix bugs, upgrades to on-board computer programs and supporting data, and the like.

Figure 2:
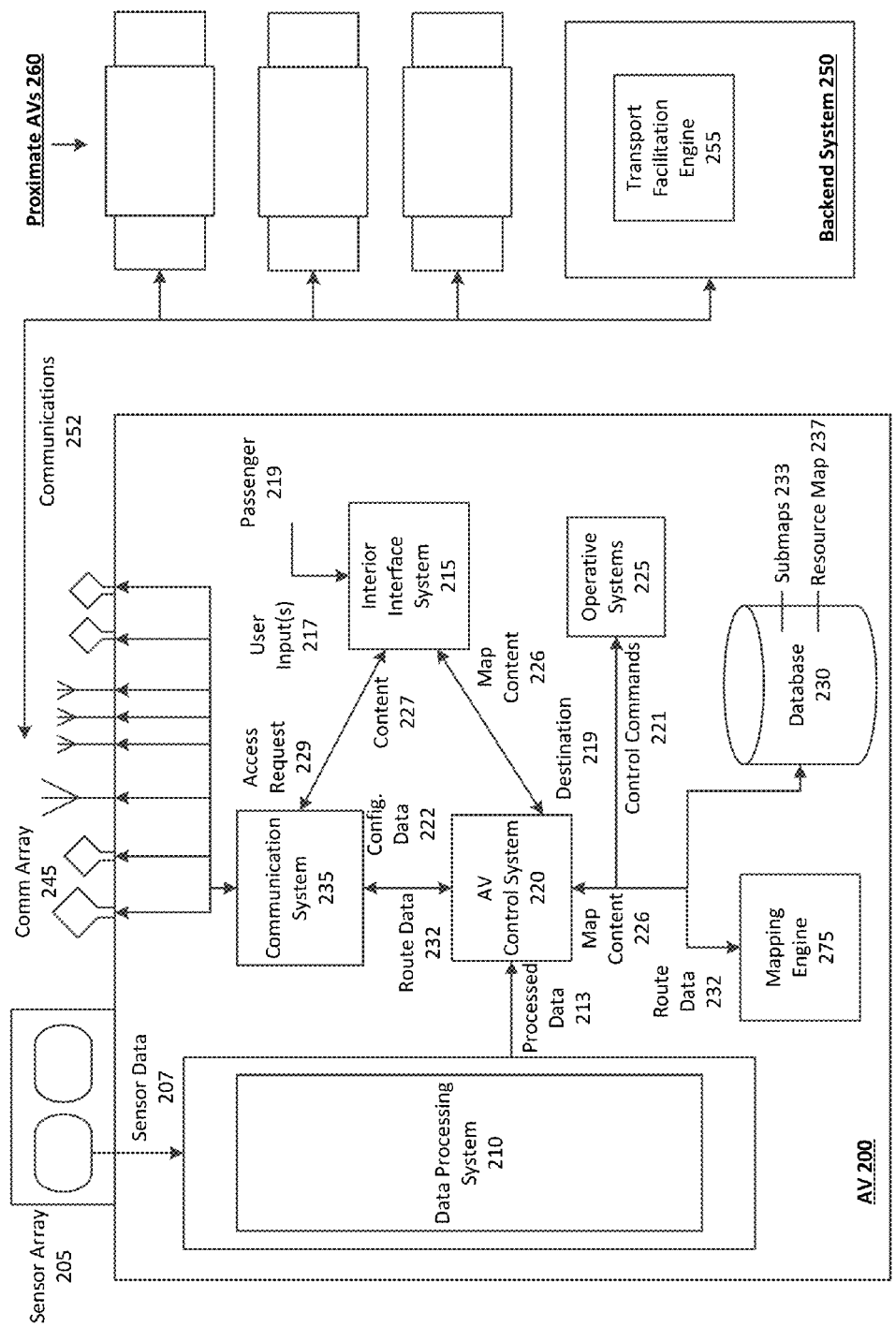
FIG. 2 is a block diagram showing an example AV in communication with a number of proximate AVs and a backend system.

FIG. 2 is a block diagram showing an example AV 200 in communication with a number of proximate AVs 260 and a backend system 250. As shown in FIG. 2, communications 252 (such as the communications 160 described in connection with FIG. 1) are transmitted and received between the AV 200, proximate AVs 260, and the backend system 250. The backend system 250 can include a transport facilitation engine 255 that generates and transmits transport commands 170 and manages a fleet of AVs within a given region. For any given AV (e.g., AV 200) in the managed fleet, the transport commands can be received by the AV's communications array 245, which is operated by the AV's 200 communication system 235. The communication system 235 can transmit the transport commands to an AV control system 220, which can operate the acceleration, steering, braking, lights, signals, and other operative systems 225 of the AV 200 in order to drive and maneuver the AV 200 through road traffic to destinations specified by the transport commands.

In many examples, the transport commands can include route data 232, which can be processed by the AV control system 220 in order to maneuver the AV 200 along a given route (e.g., an optimized route calculated by the backend system 250) to the specified destination. In processing the route data 232, the AV control system 220 can generate control commands 221 for execution by the operative systems 225 of the AV 200 (i.e., acceleration, steering, braking, maneuvering) in order to cause the AV 200 to travel along the route to the destination.

The destination itself may be specified by the backend system 250 based on user requests (e.g., pick-up or delivery requests) transmitted from user devices (e.g., a user's smartphone executing a designated application). Additionally or alternatively, a passenger 219 of the AV 200 can provide user input(s) 217 through an interior interface system 215 of the AV 200 to specify a destination 219. In certain implementations, the AV control system 220 can transmit the inputted destination 219 as a communication 252 to the backend system 250, which can process a current location of the AV 200 (e.g., a GPS data packet) and the inputted destination 219, and perform an optimization operation to determine an optimal route for the AV to travel to the destination 219. Route data 232 comprising the optimal route can be transmitted back the AV control system 220, which can consequently maneuver the AV 200 through traffic to the destination 219 along the optimal route.

Additionally or alternatively, the route data 232 comprising the optimal route can be automatically inputted into an on-board mapping engine 275 that can provide map content 226 to the interior interface system 215. The map content 226 can indicate an estimated time of arrival and show the AV's 200 progress along the optimal route. The map content 226 can also display indicators, such as reroute commands, emergency notifications, traffic data, and the like.

Additionally, in response to a user input 217 to request network access (e.g., access to the Internet), the interior interface system 215 can generate an access request 229, which can be processed by the communication system 235 to configure the communications array 245 to transmit and receive data corresponding to the passenger's 219 interactions with either the interior interface system 215 or a personal device of the passenger's 219 (e.g., a personal computer, smartphone, tablet computer, etc.). For example, the AV 200 can include on-board WiFi, which the passenger (s) 219 can access to send and receive emails or personal messages, stream audio or video content, browse web resources, or access application services requiring network access. Based on the user interactions, content 227 can be received using the communications array 245 and via one or more currently connected networks. The communication system 235 can dynamically manage the passenger's 219 network access to avoid or minimize disruption of the content 227.

According to examples described herein, the AV 200 can further include a sensor array 205 comprising any number of live sensors for dynamically detecting the surroundings of the AV 200 while the AV 200 is in motion. The sensor array 205 can include various types of feature sensors, proximity sensors, distance sensors, depth sensors, and landscape sensors such as radar equipment, light detection and ranging (LiDAR) equipment, infrared, electromagnetic, or photoelectric proximity sensors, stereo cameras, and the like. Raw sensor data 207 from the sensor array 205 can be processed by an on-board data processing system 210 of the AV 200.

The AV 200 can further include a database 230 that includes sub-maps 233 for the given region in which the AV 200 operates. The sub-maps 233 can comprise detailed road data previously recorded by a recording vehicle using sensor equipment, such as LiDAR, stereo camera, and/or radar equipment. In some aspects, several or all AVs in the fleet can include this sensor equipment to record updated sub-maps 233 along traveled routes, and submit the updated sub-maps 233 to the backend system 250, which can transmit the updated sub-maps 233 to the other AVs in the fleet for storage. Accordingly, the sub-maps 233 can comprise ground-based, three-dimensional (3D) environment data along various routes throughout the given region.

In many aspects, the on-board data processing system 210 can provide continuous processed data 213 to the AV control system 220 to respond to point-to-point activity in the AV's 200 surroundings. The processed data 213 can comprise comparisons between the actual sensor data 207—which represents an operational environment of the AV 200, and which is continuously collected by the sensor array 205—and the stored sub-maps 233 (e.g., LiDAR-based sub-maps). In certain examples, the data processing system 210 is programmed with machine learning capabilities to enable the AV 200 to identify and respond to conditions, events, or potential hazards. In variations, the on-board data processing system 210 can continuously compare sensor data 207 to stored sub-maps 233 in order to perform a localization to continuously determine a location and orientation of the AV 200 within the given region. Localization of the AV 200 is necessary in order to make the AV 200 self-aware of its instant location and orientation in comparison to the stored sub-maps 233 in order to maneuver the AV 200 on surface streets through traffic and identify and respond to potential hazards, such as pedestrians, or local conditions, such as weather or traffic conditions.

Furthermore, localization can enable the AV 200 to tune or beam steer the communications array 245 in order to maximize communication link quality and minimize interference with other communications from other AVs (e.g., the proximate AVs 260). In certain examples, the communication system 135 can beam steer a radiation pattern of the communications array 245 in response to network configuration commands received from the backend system 150. In some implementations, the database 230 can store an up-to-date network resource map 237 that identifies network base stations and other network sources that provide network connectivity. For example, the network resource map 237 can indicate locations of base stations and available network types (e.g., 3G, 4G LTE, WiFi, etc.) providing network coverage throughout the given region.

By performing localization, the AV control system 220 can compare the AV's 200 location and orientation to the network resource map 237 to configure the communications array 245. For example, the communications array 245 can comprise any number of unidirectional antennas and/or tunable antennas (e.g., a phased array). After determining a current position and orientation in relation to proximate base stations identified in the network resource map 237, the AV control system 220 can provide the communication system 235 with array configuration data 222 in order to tune or beam steer a radiation pattern of the communications array 245 to transmit and receive data in the direction of a selected base station.

For example, the communication system 235 can dynamically perform ray tracing operations as the AV 200 travels throughout the given region. The ray tracing operations can be performed by utilizing the localization data (i.e., the current location and orientation which is continuously or periodically determined by the AV 200), and comparing the localization data with the network resource map 237 to identify proximate base stations. Other data, such as cost data and network latency data, can be extrapolated from the network resource map 237 to determine the available networks with which the AV 200 is to connect. When the networks are selected, the communication system 235 can beam steer a radiation pattern of the communications array 245 (e.g., a phased array or tunable antenna) in the direction of the base station source of the selected network(s).

In some examples, the network resource map 237 may indicate "dead zones," or network-limited areas, that do not have the necessary bandwidth required for the backend system 250 to ensure safe and reliable routing and management of the fleet of AVs. In such examples, prior to the AV 200 entering these dead zones, the transport facilitation engine 255 of the backend system 250 can coordinate the proximate AVs 260 and the AV 200 to form an AV2AV network, or a mesh network, to hop communications to a specified base station, which can transmit the communications to the backend system 250. Furthermore, since cost and network latency/reliability are major factors in communications, the backend system 250 can coordinate the AV 200 and proximate AVs 260 to dynamically form mesh networks in order relay communications through optimal lowest-cost/highest bandwidth networks.

The communications array 245 of the AV 200 can be configured for data transmissions over multiple channels simultaneously. Each channel can correspond to a current network connection having an associated cost, bandwidth availability, and communication reliability. Accordingly, communications themselves may be prioritized for transmission over the various channels based on a significance or value of each communication. Emergency communications, such as accident alerts or commands to halt the AV 200 can have a highest priority. These communications, when generated by the AV 200 or the backend system 250, can be transmitted over a most reliable network regardless of cost. On the other hand, traffic updates transmitted from the AV 200 to the backend 250 can have a relatively low priority, and can either be transmitted via a lowest cost network, or can be discarded if a cost threshold is not met.

The communications array 245 can comprise one or more omnidirectional antennas for transmitting and receiving data over any number of network types (e.g., WiFi, 4G, 4G LTE, and the like). Additionally or alternatively, the communications array 245 can comprise a plurality of unidirectional antennas which can be utilized to direct communications in a corresponding plurality of directions. Additionally or alternatively still, the communications array 245 can comprise a phased array that can be configured by the communication system 235 to adjust resonance and/or radiation pattern in order to focus communications in one or more particular directions (e.g., towards a proximate AV 260 to establish a mesh network or a particular base station). Accordingly, the communication system 235 can configure the phased array to connect with a plurality of active networks by dynamically beam steering a radiation pattern of the phased array towards one or more base stations that provide the plurality of active networks as the AV 200 maneuvers through road traffic. Still further, the communications array 245 can include one or more tunable antennas that include conductive liquid metal that can be excited (e.g., using inputted voltage signals at a number of voltage points on the tunable antenna) to change length and shape, and thus adjust a resonance and radiation pattern.

In the above description of FIG. 2, certain operations may be performed interchangeably by the backend system 250 or the AV 200 in order to load balance between on-board processing capabilities of the AV 200 and network availability and/or data transmission costs. For example, upon receiving an transport command, the AV 200 itself can utilize the network resource map 237 to perform an optimization operation to determine an optimal route to the destination indicated in the transport command. The optimization operation can utilize connectivity and data transmission costs, network latency information, road traffic and estimated time of arrival (ETA) data, and the like. Furthermore, in certain implementations, the AV 200 (as opposed to the backend system 250) can identify proximate AVs 260 and establish mesh networks automatically when the AV 200 travels through the identified dead zones.

Figure 3:
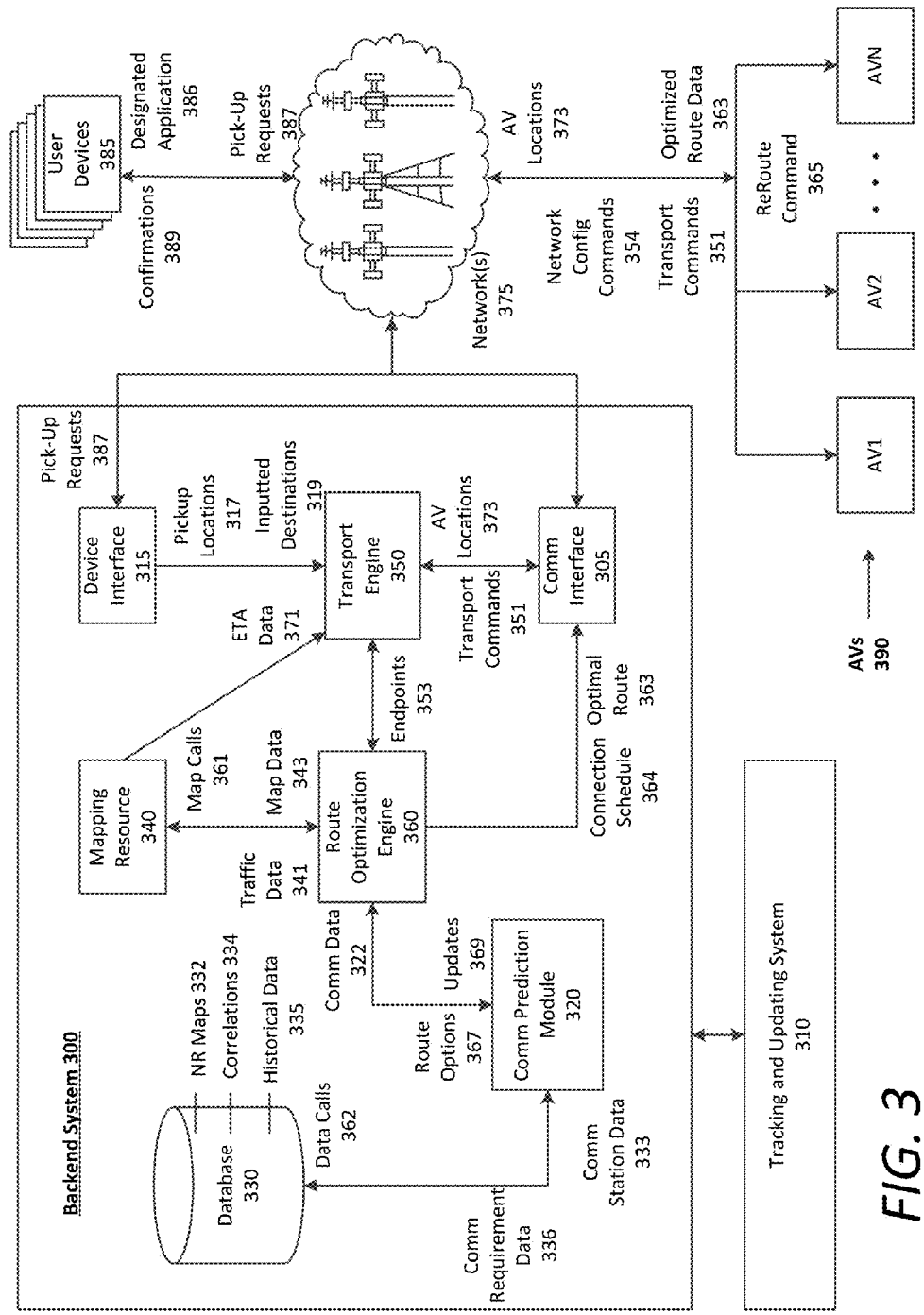
FIG. 3 is a block diagram showing an example backend system in communication with a number of user devices and AVs.

FIG. 3 is a block diagram showing an example backend system 300, or transportation facilitation system, in communication with a number of user devices 385 and AVs 390. The backend system 300 can be implemented, for example, as the backend system 250 described in connection with FIG. 2. Referring to FIG. 3, the backend system 300 can include a database 330 that stores network resource maps 332 for a given region. The database 330 can further store dynamically updated correlation data 334 between base stations on the network resource maps 332 and network latency/costs to enable a route optimization engine 360 to determine optimal routes for the AVs 390.

In many aspects, the backend system 300 can communicate with user devices 385 over one or more networks 375. For example, the user devices 385 can store a designated application 386 specific to requesting transportation via the backend system 300. Upon launching the designated application 386, a user device 385 can establish a connection with the backend system 300 and the user can submit a pick-up request 387. The pick-up request 387 can be received by a device interface 315 of the backend system 300. The device interface 315 can transmit a pick-up location 317 and an inputted destination 319 from the pick-up request 387 to a transport facilitation engine 350 of the backend system 300.

Furthermore, the backend system 300 can communicate with a fleet of AVs 390 (shown as AV1, AV2 . . . , AVN) via the one or more networks 375. The AVs 390 can periodically transmit their AV locations 373 over the network(s) 375, which can be received by a communication interface 305 of the backend system 300. The communication interface 305 can transmit the AV locations 373 to the transport facilitation engine 350 to enable the transport facilitation engine 350 to identify and select an AV (e.g., AV1) from the fleet of AVs 390 to service the pick-up request 387.

The transport facilitation engine can utilize the pick-up location 317, the AV locations 373, and/or ETA data 371 from a mapping resource 340 to select one of the AVs 390 to service the pick-up request. In many implementations, a closest available AV, or an AV with shortest ETA, is selected by the transport facilitation engine 350 to service the pick-up request 387. Accordingly, the transport facilitation engine 350 can generate and transmit a transport command 351 to the selected AV to pick-up the requesting user.

According to examples described herein, the transport facilitation engine 350 can submit the pick-up location 317 and destination 319 (the "endpoints" 353) to the route optimization engine 360. The route optimization engine 360 can identify a plurality of route options 367 between the pick-up location 317 and the destination 319. These route options 367 can be forwarded to a communications prediction module 320, which can utilize the route options 367 to make data calls 362 to the database 330 in order to look up communication requirement data 336 along each of the route options 367, and base station data 333 from the stored network resource maps 332. The communications prediction module 320 can determine the communications requirements 336 of the selected AV, and can provide the route optimization engine 360 with communications data 322 for each of the routes 367.

In many examples, the communications data 322 can include connectivity and data transmission requirements along each of the route options 367. For example, the communication prediction module 320 can utilize historical data 335 indicating how much communication is necessary between AVs 390 and the backend system 300 based on a time of day (e.g., rush hour), a time of week (e.g., weekends vs. weekdays), typical traffic conditions, pedestrian conditions, venues and/or places of business along the routes 367 (e.g., a sporting facility housing popular sporting events, a popular night club, hospitals, business buildings, etc.), scheduling information (e.g., sporting schedules, business hours, etc.), and types of routes (e.g., highways, one-way streets, whether a particular road along a respective route includes street parking, whether there are bicycle lanes along a respective route, a number of lanes and lane changes per route segment, a number of route segments or street changes, and the like).

Additionally, the communications data 322 can include cost data indicating predicted costs of communicating over connected networks along each of the route options 367. For example, the communications prediction module 320 can extrapolate, for each of the route options 367, the number of networks available along the route, the types of available networks (e.g., 900 MHz unlicensed, 3G and/or 4G, 4G LTE, WiFi, WiMax, WiGig, DSRC, etc.), and costs associated with connecting to and transmitting/receiving data over the course of each of the possible route options 367.

In some aspects, the communications prediction module 320 can utilize (i) the cost data for each of the route options 367, and (ii) the connectivity and data transmission requirements for each of the route options 367, in order to provide a predicted cost for each of the route options 367 for the predicted communications 336. The predicted costs for each of the route options 367 can be included in the communications data 322 and submitted to the route optimization engine 360, which can perform an optimization operation to select an optimal route 363 from the plurality of route options 367. As such, the optimal route 363 need not necessarily be the lowest cost route indicated in the communications data 322.

According to many examples, the route optimization engine 360 can utilize the communications data 322—which can include the cost data for each possible route 367—and can also make map calls 361 to the mapping resource to select the optimal route 363. Specifically, the route optimization engine 360 can utilize the endpoints 353 between the pick-up location 317 and the inputted destination 319 in order to make a map call 361 to the mapping resource 340 to identify map data 343, traffic data 341, and/or ETA data 371. The route optimization engine 360 can perform the optimization operation by determining a shortest ETA/lowest cost, or lowest traffic/lowest cost calculation among the route options 367. For example, a lowest cost route may have a relatively long ETA, and thus the optimization operation may sacrifice some additional cost for a shorter ETA. Conversely, a shortest ETA may have a relatively high cost, and thus the optimization operation may sacrifice time for savings.

In some aspects, the route choice may be made by the requesting user when the selected AV makes the pick-up. The requesting user may be presented with the route options 367, and a predicted cost may be associated with each of the plurality of route options 367. For example, when the requesting user is picked up by the AV, the requesting user may be prompted on an interior interface display of the AV to select one of the route options 367. Each of the route options 367 can be displayed with a predicted cost and an ETA, and the user can decide which of the route options 367 is preferred. A user selection of a route can cause the selected AV to initiate travel to the destination along the selected route.

In other aspects, the route optimization engine 360 selects the optimal route 363 based on the performed optimization operation. After the transport facilitation engine 350 sends the transport command 351 to the selected AV to service the pickup request 387, the route optimization engine 360 can transmit data corresponding to the optimal route 363 to the selected AV via the communication interface 305. Upon picking up the requesting user, the selected AV can travel to the destination along the optimal route 363. Furthermore, based on the communications data 322 provided to the route optimization engine 360 by the communications prediction module 320, the backend system 300 can transmit network configuration commands 354 to the selected AV to indicate where, along the optimal route 363, the selected AV is to connect with selected networks, and transmit and receive different types of communications over those networks.

The backend system 300 can further include a tracking and updating system 310 (described in detail with respect to FIG. 5 below). The tracking and updating system 310 can track the AV locations 373 to identify when a specified AV will enter a dead zone, or network-limited area as identified on the network resource maps 332. In response, the tracking and updating system 310 can generate network configuration commands 354 to cause particular AVs 390 to establish mesh networks with other AVs in order to relay communications between the "off-network" AV and the backend system 300. Furthermore, for crowded networks, the tracking and monitoring system 310 can generate network configuration commands 354 to cause certain AVs to "throttle down" communications or data streaming when a particular network is stressed. For example, a 4G LTE network can encompass a portion of the given region that has high auto traffic and high pedestrian traffic, which may require additional communications between the AVs 390 and the backend system 300. The tracking and updating system 310 can identify the crowded network and transmit network configuration commands to cause AVs in the crowded network area to reduce bandwidth usage (e.g., throttle down Internet data transmission to user devices of passengers within the AVs) in order to free up bandwidth for necessary communications between the AVs 390 and the backend system 300.

Additionally or alternatively, the tracking and updating module 310 can further receive sub-map updates, network cost updates, and network latency updates from the AVs 390 throughout the given region. The tracking and updating module 310 can compare the foregoing updates to currently stored data, and update stale data accordingly, as described below with respect to FIG. 5.

Referring to FIG. 3, as provided herein, the backend system 300 can manage the fleet of AVs 390 across a given region (e.g., a given city, land area, or population of users). The communications prediction module 320 can utilize the network resource maps 332 which can indicate various areas through the given region where differing types of networks are available. The network resource maps 332 can comprise one or more spectrum heat maps that indicate network coverage strength for network types originating from base stations located throughout the given region.

In various examples, the stored resource or heat maps 332 can be in varying resolutions and/or may refer specifically to road segments or even road lanes throughout the given region. In some aspects, these heat maps 332 can contain, for each network, an average bandwidth, an average latency, and average packet loss, and/or network jitter. Furthermore, the spectrum heat maps 332 can comprise separate values for each direction of transmission between the AVs 390 and the backend system 300. Still further, the backend system 300 can collect the above network quality data over the course of multiple days and store separate heat maps 332 indicating such network data for use at different times of the day (e.g., rush hour versus the middle of the night). Additional examples include separate spectrum heat maps 332 containing network quality data for different times of the week, (e.g., weekends versus weekdays) and/or separate heat maps 332 for different times of the year (e.g., seasonal heat maps 332). In still further examples, separate spectrum heat maps 332 can be linked to particular scheduled events in a given city or region that may affect both network and physical traffic in the given region. For example, the backend system 300 can store an individual, localized spectrum heat map 332 for use when a particular sporting event (e.g., an American football game) is in occurrence.

The communications prediction module 320 can dynamically receive this network quality data corresponding to each of the network types from the fleet of AVs 390 traveling throughout the given region. In response, the communication prediction module 320 can dynamically update the network resource maps 332 (e.g., the spectrum heat maps) to indicate the network quality data. As used herein, the network quality data can include, for each network, an average bandwidth, an average latency, and average packet loss, and/or network jitter, and can further include separate values for each direction of transmission between the AVs 390 and the backend system 300 and/or timing data linked to the foregoing data. In many examples, upon identifying a particular pick-up location 317 and destination 319, the backend system 300 can utilize the updated spectrum heat map to (i) determine the optimal travel route 363 from the pick-up location 317 to the destination 319, and (ii) identify a plurality of the base stations and a corresponding plurality of network types with coverage along the optimal travel route 363.

In some aspects, the communication prediction module 320 can determine an optimal connection schedule 364 for the selected AV prior to the AV traveling from the pick-up location 317 to the destination 319. The optimal connection schedule 364 can indicate location points along the optimal travel route 363 at which the selected AV is to switch from a previous network connection to a succeeding network connection. Thus, the communications prediction module 320 can perform an optimization technique to address connection and transmission costs, signal strength and/or quality, and network type, and location points along the optimal route 363 in order to generate the connection schedule 364 for the selected AV. The backend system 300 can transmit the connection schedule 364 to the selected AV to enable the selected AV to connect with the selected networks at the appropriate locations along the optimal route 363.

Accordingly, the backend system 300 can determine the optimal connection schedule 364 by identifying, from the spectrum heat map (i.e., a network resource map 332), a string of networks along the optimal travel route 363 that have a highest respective bandwidth, or highest signal strength. Additionally or alternatively, the backend system 300 can determine the optimal connection schedule 364 by identifying, from the spectrum heat map (i.e., a network resource map 332), a string of networks along the optimal travel route 363 that have a lowest respective connection and data transmission cost above a minimum network bandwidth threshold (e.g., 300 Mbps).

In certain examples, the available networks may cover the entirety of the given region. In other examples, dead zones where limited network connectivity exists may be identified within the given region. To mitigate the lack of communication when AVs 390 travel through these dead zones, the transport facilitation engine 350 can include a route tracking functions by utilizing the AV locations 373. The transport facilitation engine 350 can identify when certain AVs in the fleet are to travel through a dead zone, and utilize currently planned routes for other AVs near the dead zone in order to facilitate establishing a mesh network in order to transmit and receive communications while the AVs travel through the dead zone(s). Accordingly, the transport facilitation engine 350 can transmit reroute commands 365 to the AVs 390 at any given time in order to facilitate a mesh network to "hop" communications to an available network so that a connection between the backend system 300 and each of the fleet of AVs 390 may be continuous.

The reroute commands 365 may simply command an AV to slow down or speed up in order to act as a network node between an AV in a dead zone and a base station. Additionally, the reroute commands 365 can cause a particular AV to make a detour in order to facilitate and establish a reliable mesh network. Accordingly, connectivity between the AVs 390 can be established by utilizing communication resources of the AVs 390 themselves (e.g., DSRC resources). Also, as network nodes, the AVs 390 can aid other AVs 390 with not only communication through dead zones, but also with lowering costs by hopping communications to a less expensive network.

Figure 4:
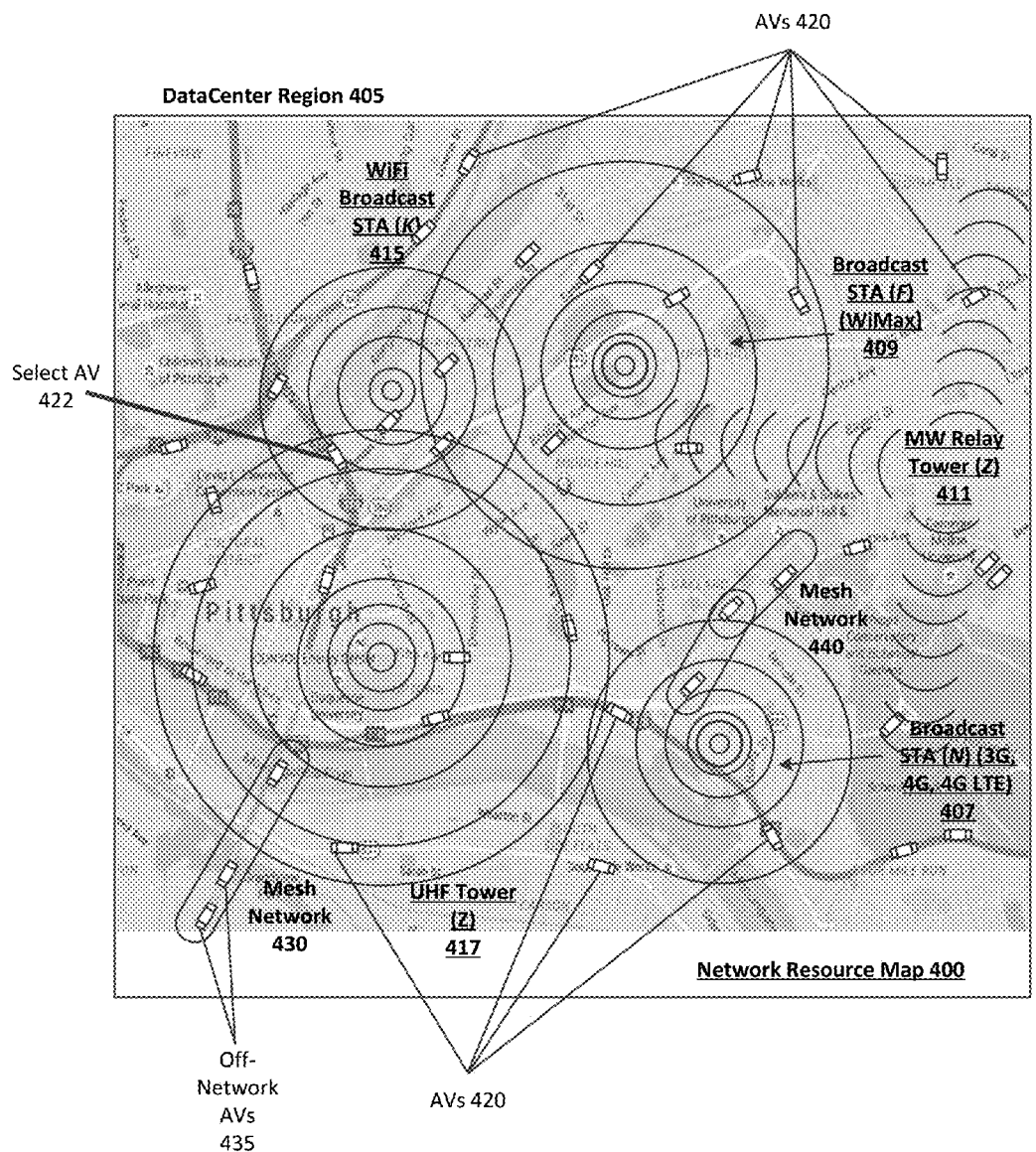
FIG. 4 illustrates an example network resource map utilized by an example backend system and/or an example AV, as described herein.

FIG. 4 illustrates an example network resource map 400 utilized by an example backend system and/or example AVs 420 in communication with the example backend system 300, as described herein. In the below description of FIG. 4, the network resource map 400 can encompass a given region, such as a datacenter region 405 managed by an example backend system 300 described in connection with FIG. 3. Furthermore, the network resource map 400 can be a network resource map 332 stored in the database 330 of the backend system 300 of FIG. 3. Still further, in certain implementations, the network resource map 400 can be utilized by AVs 420 themselves, and thus locally stored as, for example, the network resource map 237 described in connection with the AV 200 of FIG. 2.

Referring to FIG. 4, the network resource map 400 can indicate base station locations for any number of network types. As shown, certain base stations can include network hardware for multiple different network types, such as, for example, 3G, 4G, 4G LTE, WiFi, etc. Additionally, certain base stations can be specialized for specific network types, and thus include only hardware for that particular network (e.g., microwave relay tower 411 for microwave WiFi or WiGig communications). For illustrative purposes, the network resource map 400 includes AVs 420 currently traveling throughout the datacenter region 405.

At any given time, the AVs 420 can switch between base stations and/or between networks provided by the base stations. For example, a selected AV 422 may be traveling south on Interstate 579 in Pittsburgh through a coverage area of WiFi Broadcasting Station K 415, which provides available communications channels in the 2.4 GHz ISM frequency bands. Communications over network(s) provided by WiFi Broadcasting Station K 415 may incur associated costs. UHF Tower Z 417, providing available communication channels in the 900 MHz unlicensed band, can provided network connectivity and data communications with the backend system 300 for far less cost. However, the communications may be less reliable. Accordingly, as the selected AV 422 enters the network coverage area for UHF Tower Z 417 (providing available communication channels in the 900 MHz unlicensed band), the selected AV 422 can switch to the 900 MHz frequency band to transmit certain types of lower priority data via UHF tower Z 417.

In certain examples, the selected AV 422 may still transmit certain types of data over the WiFi network(s) via WiFi Broadcasting Station K 415. For example, certain types of data may have a higher priority, such as emergency communications or status updates. Conversely, other types of communications may have a lower priority, such as sub-map updates—which can be transmitted, for example, at the end of the day when networks are less crowded. According to examples provided herein, while the selected AV 422 is connected with both WiFi Broadcast Station K 415 and UHF Tower Z 417, the selected AV 422 can transmit and receive higher priority data (e.g., alerts, status updates, route updates, user requests, etc.) with the backend system over the WiFi network via WiFi Broadcasting Station K 415, and lower priority data (e.g., traffic data, sub-map updates, interior video/audio data, etc.) over the unlicensed radio band via UHF tower Z 417.

In various aspects, AVs 420 traveling throughout the datacenter region 405 can switch between networks and base stations dynamically based on network configuration commands transmitted to the AVs 420 by the backend system 300. As discussed herein, the network configuration commands can be generated based on connection and data transmission costs, signal strength, network latency data, base station proximity, mesh network availability, and the like. In variations, the AVs 420 can perform ray tracing and optimization operations to dynamically switch between networks and base stations based on the foregoing parameters. Further shown in FIG. 4, is a mesh network 440 between AVs that opt to utilize a less costly network offered by Broadcast Station N 407 as compared to the Microwave Relay Tower Z 411.

Whether selected by the backend system or the AVs 420 themselves, the AVs 420 can connect to various network types provided by various base stations. Certain AVs 420 can travel through areas having coverage by one or multiple base stations (e.g., Broadcast Station N 407, offering network connectivity for 3G, 4G, and 4G LTE network types, or Broadcast Station F, offering connectivity for WiMax). In certain implementations, the AVs 420 may travel through network-limited areas or dead zones. These instances may be identified when the optimal routes are calculated by the backend system 300 or AVs 420 themselves, or may be determined on the fly by either the backend system 300 or individual "off-network" AVs 435 (i.e., AV's that exit available coverage areas). In either case, the off-network AVs 435 can form a mesh network 430 to relay communications to and from the backend system 300 over a network provided via UHF Tower Z 417.

According to examples provided herein, the AVs 420 can include communication arrays 245 that can dynamically direct communications to respective base stations in response to network configuration commands generated by the backend system, or the communications systems 235 of the AVs 420 themselves. The communications arrays 245 of the AVs 420 can include dedicated antennas (e.g., a 4G LTE antenna), multi-channel antennas, omnidirectional antennas, multiple unidirectional antennas, a phased array, and/or a tunable antenna. In the latter examples, the communications systems 235 of the AVs 420 can, in response to network configuration commands, selectively apply voltage to specific antenna points to configure a resonant frequency and/or radiation pattern of the antenna. As such, less power is needed to increase network bandwidth and consequently decrease interference with other transmissions from proximate AVs 260.

The above description in connection with FIG. 4 provides coarse non-limiting examples of AVs 420 traveling throughout the datacenter region 405 merely for illustrative purposes. The network resource map 400 is also shown to broadly indicate coverage areas for base stations and network types for illustrative purposes. Thus, the network resource map 400 shown and described with respect to FIG. 4 is not intended to limit the description provided herein in any way.

Figure 5:
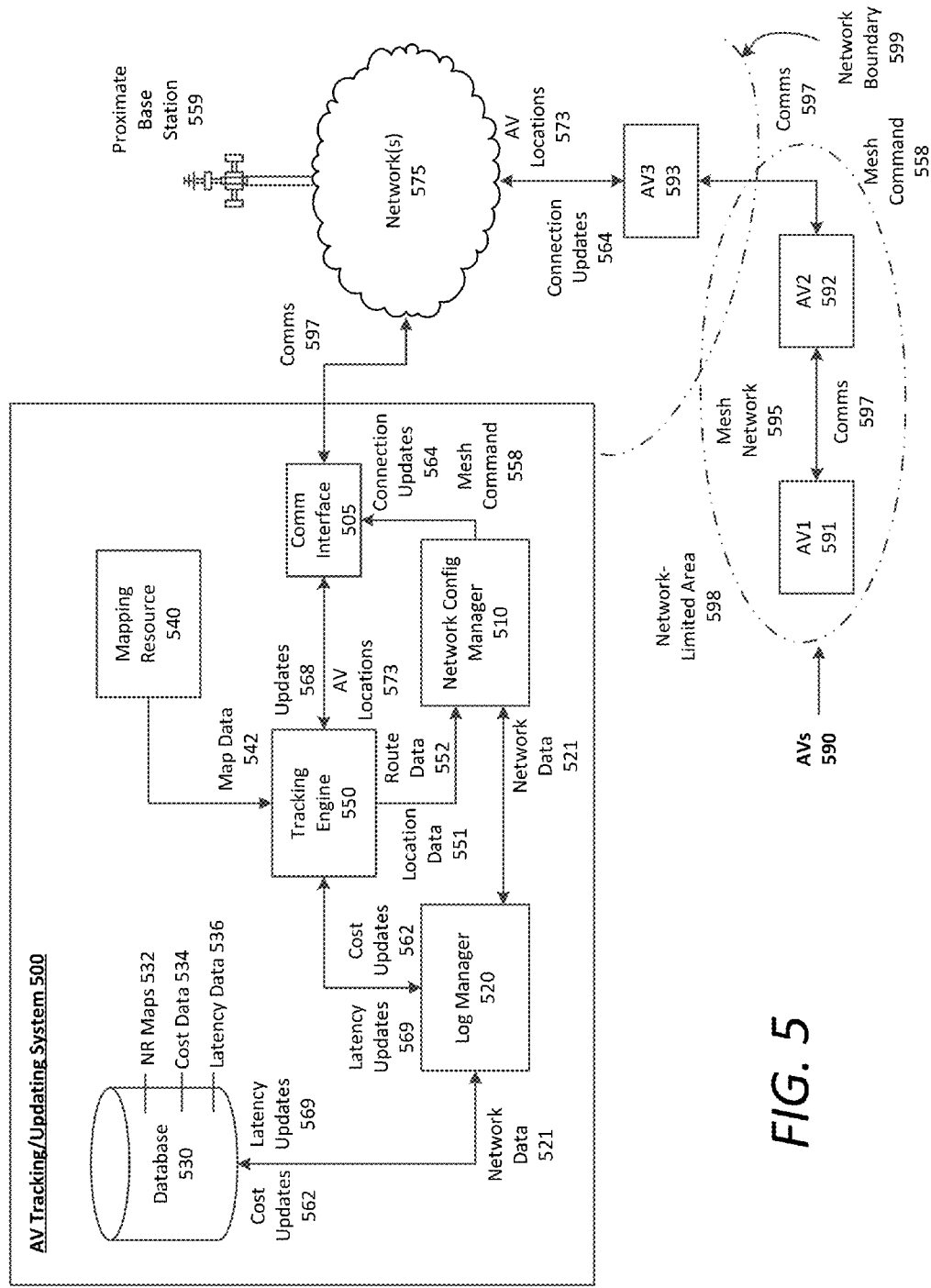
FIG. 5 illustrates an example AV tracking and updating system for use in connection with a backend system.

FIG. 5 illustrates an example AV tracking and updating system 500 for use in connection with a backend system, such as the backend system 300 shown and described with respect to FIG. 3. Furthermore, the AV tracking and updating system 500 can be implemented as, for example, the tracking and updating system 310 shown and described with respect to FIG. 3. Referring to FIG. 5, the AV tracking and updating system 500 can include a database 530 with network resource maps 532, such as an example network resource map 400 shown and described in connection with FIG. 4. As such, the network resource maps 532 can comprise a spectrum heat map indicating base station locations and corresponding coverage areas for various network types throughout the given region. Furthermore, the database 530 can store correlative data such as cost data 534 that indicate costs associated with connecting to and transmitting data over respective networks throughout the given region. Still further, the database 530 can also store network latency data 536 for each of the networks available throughout the given region.

According to examples described herein, the AV tracking and updating system 500 can include a communication interface 505 to receive communications 597 from a fleet of AVs 590 being sent out and managed by the backend system 300. The communications can be received via one or more networks 575 with which the AVs 590 individually connect while traveling throughout the given region. The tracking engine 550 can utilize a mapping resource 540 to correlate the AV locations 573 with map data 542 to provide location data 551 to a network configuration manager 510 of the AV tracking and updating system 500. The network configuration manager 510 can lookup network data 521 from the network resource maps 532, the network latency data 536, and the cost data 534, and perform an optimization operation to generate connection updates 564 to the AVs 590.

For example, as the AVs 590 are selected and sent out throughout the given region, the network configuration manager 510 can compare the location data 551 of the AVs 590 to update network data 521 stored in the database 530 to further optimize data communications via specified networks in terms of costs, types of communications, network latency, and/or mesh networking. Accordingly, as the AVs 590 travel throughout the region along optimal routes calculated by the backend system 300, the AV tracking and updating system 500 can dynamically identify additional optimal communications options using the location data 551 of the AVs 590 and the updated network data 521 stored in the database 530.

As a dynamic system, the AVs 590 being sent out and traveling throughout the given region can provide updates 568 to the network data 521, such as network latency updates 569 and cost updates 562. For example, as a particular AV (e.g., AV3 593) travels throughout the given region, AV3 593 can connect with various networks 575, including multiple networks at the same time. In addition to providing its AV location 573, AV3 593 can provide latency data for each network with which AV3 593 connects. The latency data can indicate a current transmission quality for a particular network type providing network coverage along the optimal route traveled by AV3 593. AV3 593 can provide the updated latency data (i.e., a latency update 569) to the AV tracking and updating system 500, which can be processed by a log manager 520. The log manager 520 can update the latency data 536 stored in the database 530 with the latency update 569 provided by AV3 593, and flush stale latency data accordingly.

The latency updates 569 can be provided by some or all of the AVs 590 traveling throughout the given region. Thus, the AV tracking and updating system 500 can maintain updated logs comprising each network source utilized throughout the given region and current network latency data 536 for those network sources. Likewise, the updated logs can include current cost data 534 for each network source. The AVs 590 traveling throughout the given region can provide cost updates 532 to the log manager 520 along with the latency updates 569. The cost updates 562 can include current connectivity and data transmission costs for each of the networks. Accordingly, the log manager 520 can also log the cost updates 562 dynamically for each of the networks and flush stale cost data accordingly.

In some aspects, the updated cost data 534 and network latency data 536 (collectively network data 521), can be utilized by the network configuration manager 510 to generate connection updates 564 for the AVs 590. For example, utilizing the network data 521, the network configuration manager 510 can dynamically identify certain network sources that provide unacceptable bandwidth for the communications costs. Furthermore, the network configuration manager 510 can identify alternative network sources throughout the given region, and generate and transmit connection updates 564 for AVs 590 traveling through those coverage areas. The connection updates 564 can command or otherwise direct the AVs 590 to switch to the alternative networks instead of the initially proposed networks (i.e., based on the initial connection schedule 364 transmitted by the backend system 300 as described in FIG. 3).

Additionally or alternatively, certain network areas may lack acceptable bandwidth and/or cost efficiency for available bandwidth. Using the location data 551 (or route data 552 comprising the optimal routes currently traveled by the AVs 590 as calculated by the backend system 300), the network configuration manager 510 can identify a proximate base station 559 providing adequate bandwidth/cost in relation to those network areas. That is, the proximate base station 559 can provide network coverage that is optimal, but outside the identified areas. These areas may be network-limited areas 598 or dead zones, in which communication connectivity is unavailable, or areas where connectivity is available, but the network latency and/or costs for transmitted data over such connections does not meet a certain efficiency threshold.

According to examples described herein, the network configuration manager 510 can create mesh networks 595 amongst AVs 590 to relay communications between AVs 590 to the proximate base station 559. Using the location data 551 for the AVs 590, and the network data 521 identifying the network-limited areas 598, the network configuration manager 510 can identify respective AVs (e.g., AV1 591 and AV2 592) that are traveling into these areas 598, and transmit mesh commands 558 to those AVs 591, 592 in order to establish mesh networks 595 between the AVs 590 to relay communications 597 to the proximate base station 559 for transmission to the backend system 300.

In the example provided in FIG. 5, AV1 591 and AV2 592 travel across a network boundary 599 corresponding to a network coverage area (e.g., a 4G coverage area) from a proximate base station 559, and into a network-limited area 598. Using the location data 551 and/or the route data 552 for AV1 591 and AV2 592, the network configuration manager 510 can generate a mesh command 558 to cause AV1 591 and AV2 592 to establish a mesh network 595 to relay communications 597 to the proximate base station 559 through AV3 593. The mesh command 558 can be transmitted to AV1 591, AV2 592, and AV3 593 prior to traveling into the network-limited area 598 so that the mesh network 595 can be established prior to crossing the network boundary 599 and entering the network-limited area 598.

Example AV tracking and updating systems 500 described in connection with FIG. 5 can be utilized by the backend system 300 of FIG. 3 to provide dynamic connection updates 564 in real-time while AVs 590 are traveling along their calculated optimal routes. Furthermore, the example AV tracking and updating system 500 can maintain updated network data 521 in a database 530 managed by the log manager 520 by way of updates 568 (e.g., network latency updates 569 and cost updates 562) received from the AVs 590 themselves. These updates 568 can be received as part of default periodic transmissions from the AVs 590 or as individual transmissions sent by the AVs 590 when certain thresholds (e.g., cost thresholds or latency thresholds) are exceeded. The updates 568 can indicate that certain coverage areas do not meet predetermined latency and/or cost standards. Accordingly, the network configuration manager 510 can mitigate deficient networks by transmitting connection updates 564 and/or mesh commands 558 to AVs 590 traveling along routes that would be affected by the deficient networks or dead zones.

Methodologies

Figure 6:
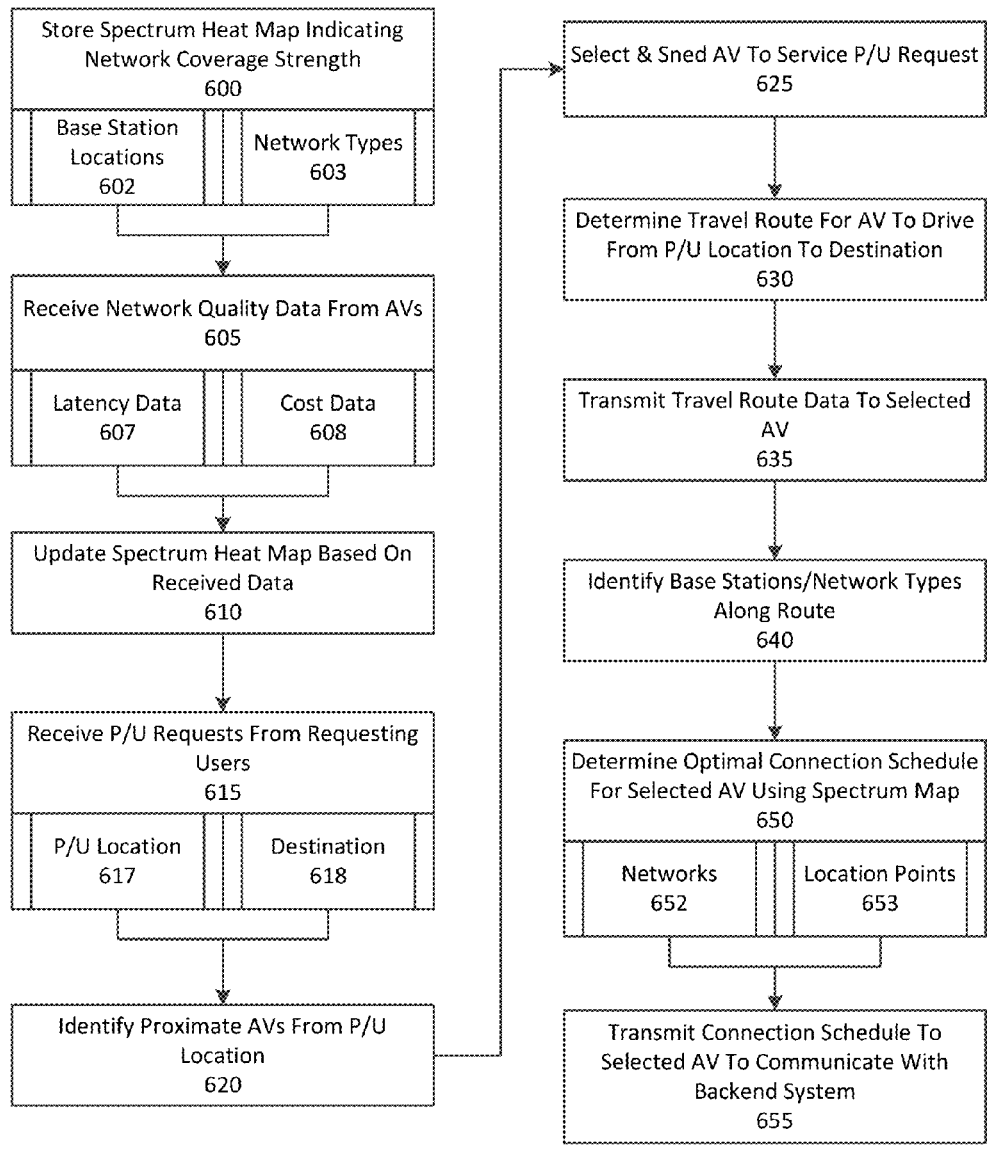
FIG. 6 is a flow chart describing an example method of managing transportation and network connection timing for a fleet of AVs throughout a given region.

FIG. 6 is an example method of managing transportation of a fleet of AVs 390 throughout a given region. In the below description of FIG. 6, reference may be made to like reference characters representing various features of FIG. 3 for illustrative purposes. Furthermore, the method described in connection with FIG. 6 may be performed by an example backend system 300 as described with respect to FIG. 3. Referring to FIG. 6, the backend system 300 can store a spectrum heat map indicating network coverage areas and/or coverage strength for available networks throughout a given region (600). As discussed herein, a given region can be a given area (e.g., a city or geographical area) managed by a datacenter of a transport arrangement service, such as those offered by UBER Technologies, Inc. The spectrum heat map can be a network resource map 332 that is stored locally or accessed remotely. Furthermore, the spectrum heat map can indicate various base station locations throughout the given region (602), as well as network types and coverage areas for those network types (603). In some examples, updatable log records are stored and managed by a log manager of the backend system 300—where the log records indicate current network data, such as connectivity and data transmission cost data and network latency data for each of the networks throughout the given region.

Additionally, the updated network data can be received by the backend system 300 from the AVs 390 being selected and sent out throughout the given region (605). These network updates 369 can indicate signal quality and/or available bandwidth for each of the available networks of the given region. The network updates 369 can include network latency data (607) indicating transmission delays due to, for example, high network traffic. The network updates 369 can further include cost data (608) indicating costs associated with connecting to a particular network and/or transmitting data over the particular network. The backend system 300 can update the spectrum heat map and/or update the log records based on the network updates 369 received from the AV 390 being sent out and traveling throughout the given region (610).

In many aspects, the backend system 300 can receive pick-up requests 387 from requesting users utilizing user devices 385, such as smartphones, personal computers, tablet computers, etc. (615). For example, a requesting user can initiate a designated application on the user device 385 and select a pick-up location 317 (617) and a destination 319 (618), and then submit a pick-up request 387 indicating the route endpoints 353 of the trip. The backend system 300 can identify proximate AVs 390 with respect to the pick-up location 317 (620), and then select and instruct an AV to service the pick-up request 387 (625). In some examples, the backend system 300 selects the AV based on a physical distance from the pick-up location 317. In other examples, the backend system 300 selects the AV based on a shortest ETA by accounting for road conditions and traffic.

In conjunction with or subsequent to instructing the AV to pick up the requesting user, the backend system 300 can determine a travel route for the selected AV to travel through road traffic from the pick-up location 317 to the destination 319 (630). In certain examples, the backend system 300 can run an optimization to select an optimal travel route 363 based on communication requirements of the selected AV, traffic data, travel distance, AV power level, available networks along a plurality of possible routes, cost data, and network latency data, as described herein. Once a travel route is identified and selected, the backend system 300 can transmit the route data to the selected AV in order to enable the AV to transport the requesting user from the pick-up location 317 to the destination 319 along the optimal route (635).

In many implementations, the backend system 300 can utilize the spectrum heat map and/or updated log records to identify base station locations, available networks (and network types), coverage areas, network quality, and network costs along the optimal route (640). The identification of such network data can be performed in response to receiving the endpoints 353 of the pick-up request 387, or dynamically as the selected AV travels along the optimal route 363 to the destination 319 (described hereinafter). In the former case, the backend system 300 can determine an optimal connection schedule 364 for the selected AV using the network heat map (650). This connection schedule 364 can indicate which networks to connect with (652), and timing data indicating location points along the optimal route 363 at which the selected AV is to connect with those networks (653). Furthermore, in constructing the connection schedule 364 for the AV, the backend system 300 can select particular frequencies or network types for connection based on factors such as distance to base stations (e.g., choosing a RF channel for long distances) or obstructions between certain road segments and base stations.

As provided herein, the connection schedule 364 can set location points along the optimal route 363 for switching connections, dropping connections, and/or connecting with a new network. The connection schedule 364 can further indicate the available networks with which the selected AV is to connect at those location points. The connection schedule 364 can be the result of an optimization performed by the backend system 300 that accounts for the types of data to be transmitted (e.g., prioritized data, non-essential data, ACKs, data updates, route updates, etc.), available bandwidth, cost, predicted communications requirements, and the like. Accordingly, the connection schedule 364 can reflect a lowest cost/highest bandwidth optimization for the route 363. Furthermore, the connection schedule 364 can indicate which types of data to transmit over which particular channels as the selected AV travels along the optimal route 363. Thus, once the backend system 300 determines the optimal connection schedule 364, the backend system 300 can transmit the connection schedule 364 to the selected AV (655).

Figure 7:
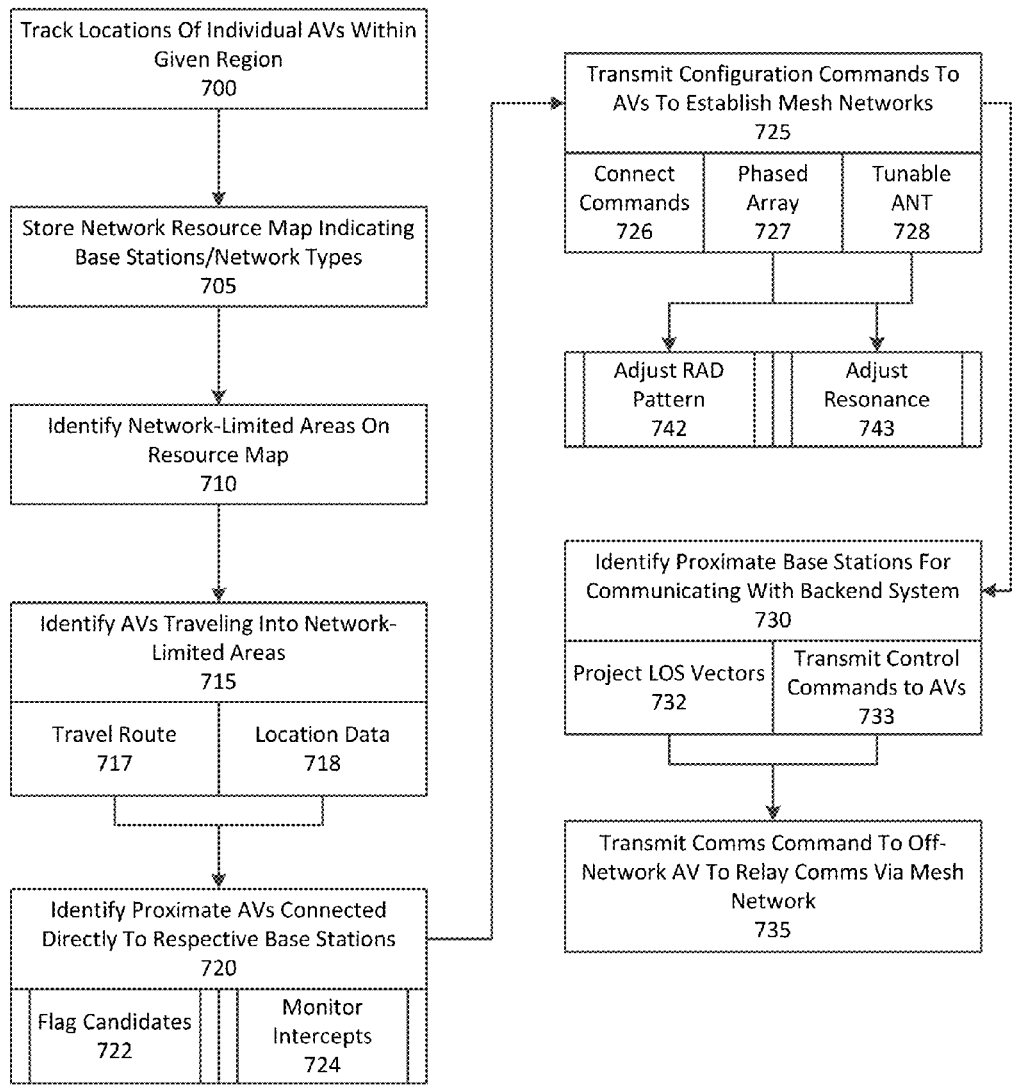
FIG. 7 is a flow chart describing an example method of managing mesh networks for a fleet of AVs throughout a given region.

FIG. 7 is a flow chart describing an example method of managing mesh networks 595 for a fleet of AVs 590 throughout a given region. In the below description of FIG. 7, reference may be made to like reference characters representing various features of FIG. 5 for illustrative purposes. Furthermore, the method described in connection with FIG. 7 may be performed by an example AV tracking and updating system 310 as described with respect to FIG. 3, or the AV tracking and updating system 500 shown and described with respect to FIG. 5. Referring to FIG. 7, the AV tracking and updating system 500 can track locations of selected AVs 590 throughout the given region (700). Further, the AV tracking and updating system 500 can store or access a network resource map 532 (e.g., via a log manager 520) that indicates various base station locations, available networks/network types, and coverage areas throughout the given region (705).

In some aspects, the AV tracking and updating system 500 can identify network-limited areas 598 on the network resource map 532 (710). These dead zones indicate areas in which communications cannot be transmitted or received directly (i.e., from base station to AV). The AV tracking and updating system 500 can identify AVs 590 traveling into the network-limited areas 598 (715). These AVs may be considered "off-network" AVs, in that they are temporarily without direct connection with the backend system 300. The AV tracking and updating system 500 can identify these off-network AVs based on the travel route (e.g., the optimal travel route 363 determine by the backend system 300 shown and described in connection with FIG. 3) (717). Additionally or alternatively, the AV tracking and updating system 500 can identify the AVs 590 traveling into the network-limited areas 598 dynamically based on received location data 573 from the AVs 590 (718).

In order to mitigate the effects of these network-limited areas 598, the AV tracking and updating system 500 can identify proximate AVs that will have network connectivity when the off-network AVs travel into the network-limited areas 598 (720). These proximate AVs may be determined based on projected intercept points on the network resource map 532 where the proximate AVs will be close enough to relay communications to the backend system 300 via a proximate base station 559. In some aspects, route projections and timing information can be extrapolated for the AVs 598 in the given region based on traffic data and map data 542.

Accordingly, the AV tracking and updating system 500 can identify candidate AVs 590 that have been assigned to service pick-up requests, and that will be within a predetermined distance from the off-network AV when the off-network AV travels into a particular network-limited area 598 (722). In some implementations, the AV tracking and updating system 500 can flag these candidate AVs as potential network nodes that can establish a mesh network 595 to relay communications to and from the off-network AVs. Additionally or alternatively, the AV tracking and updating system 500 can monitor the current routes traveled by candidate AVs (and other AVs within a radius of the off-network AV) as the off-network AV approaches the network boundary 599. The AV tracking and updating system 500 can then identify intercept points along the respective routes where the proximate AVs can establish a mesh network 595 with the off-network AV as it travels into the network-limited area 598 (724).

Prior to the AVs (i.e., the proximate AV(s) and the off-network AV) reaching the intercept points, the AV tracking and updating system 500 transmit network configuration commands to the AVs to establish a mesh network 595 (725). The configuration commands can comprise connection update commands 564 indicating which network(s) with which the proximate AVs are to connect (726). Furthermore, the configuration commands can indicate to the proximate AVs and the off-network AV to configure their on-board phased arrays in order to direct and relay communications from the proximate AVs (acting as network nodes) to the proximate base station 559, which then transmits the communications to the backend system 300 (727). Additionally or alternatively, the configuration commands can instruct the AVs to configure their on-board tunable antennae to direct and relay communications to the proximate base station 559 (728).

For phased arrays and tunable antennae, the configuration commands can include instructions to adjust a radiation pattern in order to narrow a communication link between the AVs themselves and between the proximate AVs and the proximate base station 559 (742). Thus, the AVs can implement beam steering to maintain communication links, diminish interference, and optimize the mesh network 595. Additionally or alternatively, the configuration commands can also comprise instructions to select a communication channel and adjust a corresponding resonance of the phased array and/or tunable antenna to further enhance communication quality (743).

As described, the AV tracking and updating system 500 can utilize the network resource map 532 to identify base stations near the network-limited areas 598. Based on the route of the off-network AV and projected line-of-sight vectors between the off-network AV and the proximate AVs, the AV tracking and updating system 500 can identify an optimal proximate base station 559 through which the proximate AVs can relay communications from the off-network AV (730). The AV tracking and updating system 500 can project the line-of-sight vectors for the AVs using ray tracing techniques (732). For example, using current location and orientation information of the AVs, the AV tracking and updating system 500 can utilize the network resource map 532 and/or 3D LiDAR-based sub-maps for the network-limited area 598, and perform ray tracing operations between the projected routes of the AVs and a number of base stations with a line-of-sight to at least one of the AVs. Optionally, the ray tracing operations can utilize stored topographic, utility, or other surface maps to identify potential obstructions such as buildings or hills. Based on the ray tracing operations, the AV tracking and updating system 500 can determine one or more optimal base stations and/or channels through which to transmit communications.

The ray tracing operations can be performed prior to the proximate or candidate AVs intercepting the off-network AV. Accordingly, the AV tracking and updating system 500 can simulate the AV routes for when the off-network AV enters the network-limited area 598, and determine an optimal AV configuration for relaying communications. The simulated AV configuration can include one or multiple hops between the off-network AV and the proximate base station, and several iterations may be simulated before an optimal configuration is determined by the AV tracking and updating system 500. When an optimal configuration is determined (with optimal line-of-sight vectors calculated as the off-network AV travels through the network-limited area 598), the AV tracking and updating system 500 can modify the routes of the AVs, or can cause the relative speeds of the AVs to be adjusted in order to match the optimally calculated AV configuration. Accordingly, the AV tracking and updating system 500 can generate and transmit control commands to the AVs instructions one or more of the AVs (i.e., the proximate AVs or the off-network AV prior to entering the network-limited area 598) to adjust one or more control parameters in order to maintain the calculated configuration (733).

In many aspects, the control commands can include commands instructing one or more of the AVs to speed up, slow down, change lanes, etc. Additionally or alternatively, the control commands can include a route update to reroute a particular AV in order to establish a better mesh network 595. As a dynamic process, the AV tracking and updating system 500 can cause each of the AV to perform minute adjustments, or include an additional AV (e.g., by transmitting a reroute command) to be included as a relay node in the mesh network 595. Thus, the AVs can be coordinated prior to the off-network AV entering the network-limited area 598. Accordingly, the AV tracking and updating system 500 can transmit a communication command to the off-network AV, prior to entering the network-limited area 598, instructing the off-network AV to relay communications through a number of the selected proximate AVs (735).

Figure 8:
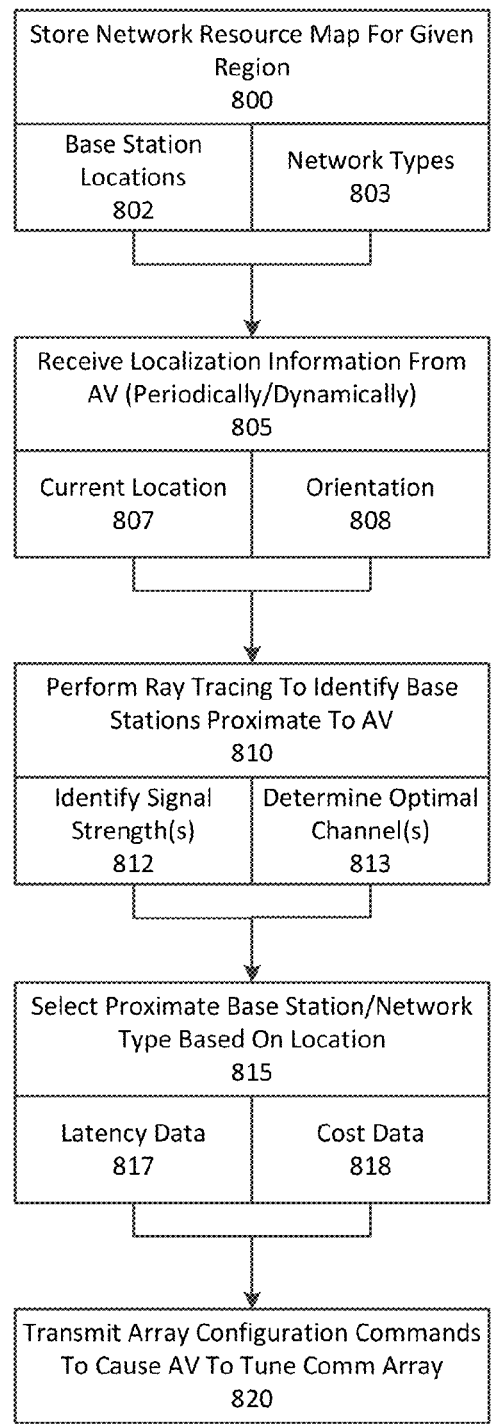
FIG. 8 is a flow chart describing an example method of selecting optimal channels for an AV using ray tracing operations.

FIG. 8 is a flow chart describing an example method of selecting optimal channels for an AV using ray tracing operations, as described herein. In the below description of FIG. 8, reference may be made to like reference characters representing various features of FIG. 5 for illustrative purposes. Furthermore, the method described in connection with FIG. 8 may be performed by an example AV tracking and updating system 310 as described with respect to FIG. 3, or the AV tracking and updating system 500 shown and described with respect to FIG. 5. Referring to FIG. 8, the AV tracking and updating system 500 can store a network resource map 532 for a given region (800) that identifies base station locations (802), available networks/network types (803), and coverage areas for each of the available networks. Furthermore, the AV tracking and updating system 500 can receive network updates from AVs 590 traveling throughout the given region.

Figure 10A:
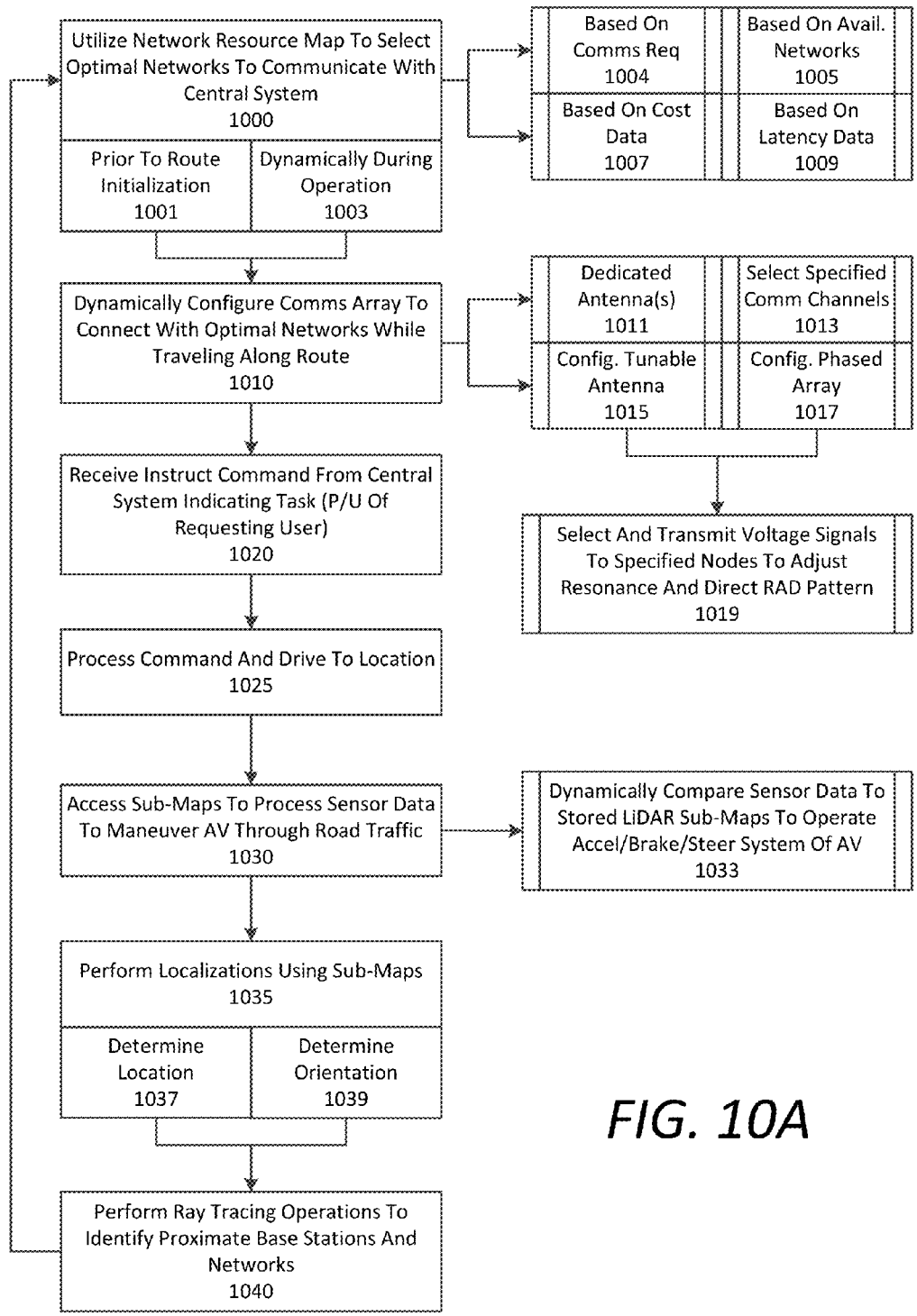
FIGS. 10A and 10B are flow charts describing example methods of channel selection and routing as performed by an example AV, as described herein.
Figure 10B:
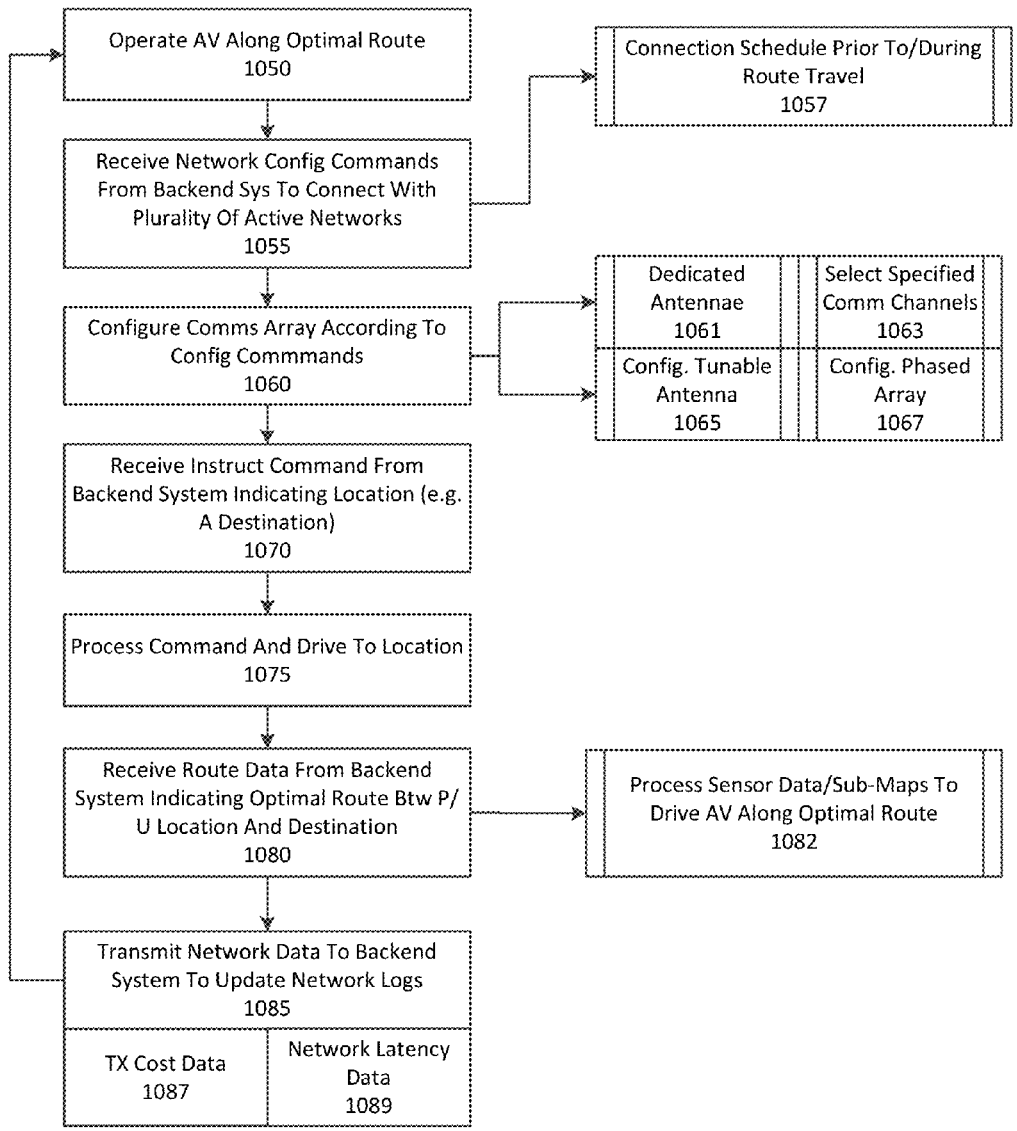

Each of the AVs 590 traveling throughout the given region can perform localization or pose operations to determine a specific location of the AV within the given region and an orientation of the AV at that location (described in detail with respect to FIGS. 10A and 10B). The AV tracking and updating system 500 can receive the localization information from a particular AV either dynamically as the AV travels throughout the given region, or periodically (e.g., in accordance with a particular transmission protocol or when the AV has stopped at a stop light) (805). As described, the localization information can include the AV's current location within the given region (807), and an orientation of the AV (808).

Using the network resource map 532 and/or surface level sub-maps for the given region, the AV tracking and updating system 500 can perform ray tracing operations to identify base stations and/or optimal networks with which the AV can connect (810). In certain implementations, the AV tracking and updating system 500 can further utilize other surface maps, such as topographic maps to identify potential obstructions in the line-of-sight between the AV and candidate base stations. In addition to the above description of projecting line-of-sight vectors from the AV, the AV tracking and updating system 500 can further identify communications resources of the AV itself. Accordingly, the AV tracking and updating system 500 can determine whether the AV houses omnidirectional antenna(s), a number of unidirectional antennas, dedicated antennas, a phased array, and/or a tunable antenna, and can further determine whether the AV is capable of communicating using any number of communications protocols (e.g., 3G, 4G, 4G LTE, DSRC, WiFi, WiGig, WiMax, 900 MHz bands, and the like). Based on the communication capabilities of the AV, the AV tracking and updating system 500 can determine optimal channels for communications between the AV and the backend system 300 (813).

Additionally or alternatively, the AV tracking and updating system 500 can determine signal strengths and/or available bandwidth for each of the channels offered by the proximate base stations (812). The AV tracking and updating system 500 can do so by receiving network data from the AV itself, such as received signal strength indication (RSSI) information, or by performing a lookup in historical network data and/or continuously updated data stored in a local database. As described herein, the AV tracking and updating system 500 can receive updated network data from the AVs 590 that indicate current network latency for any number of networks.

In many aspects, the AV tracking and updating system 500 can select a proximate base station and network types with which the AV is to connect based on the current location of the AV (815). The AV tracking and updating system 500 can make these selections based on the available bandwidth of the available networks, the communication resources of the AV itself, the network latency data (817), and/or the cost data (818) for transmitting and receiving communications over each of the available networks. Once the base station(s) and networks are selected, the AV tracking and updating system 500 can transmit array configuration commands to the AV to cause the AV to configure or otherwise tune its communications system in order to connect with the selected base stations and networks (820).

Figure 9A:
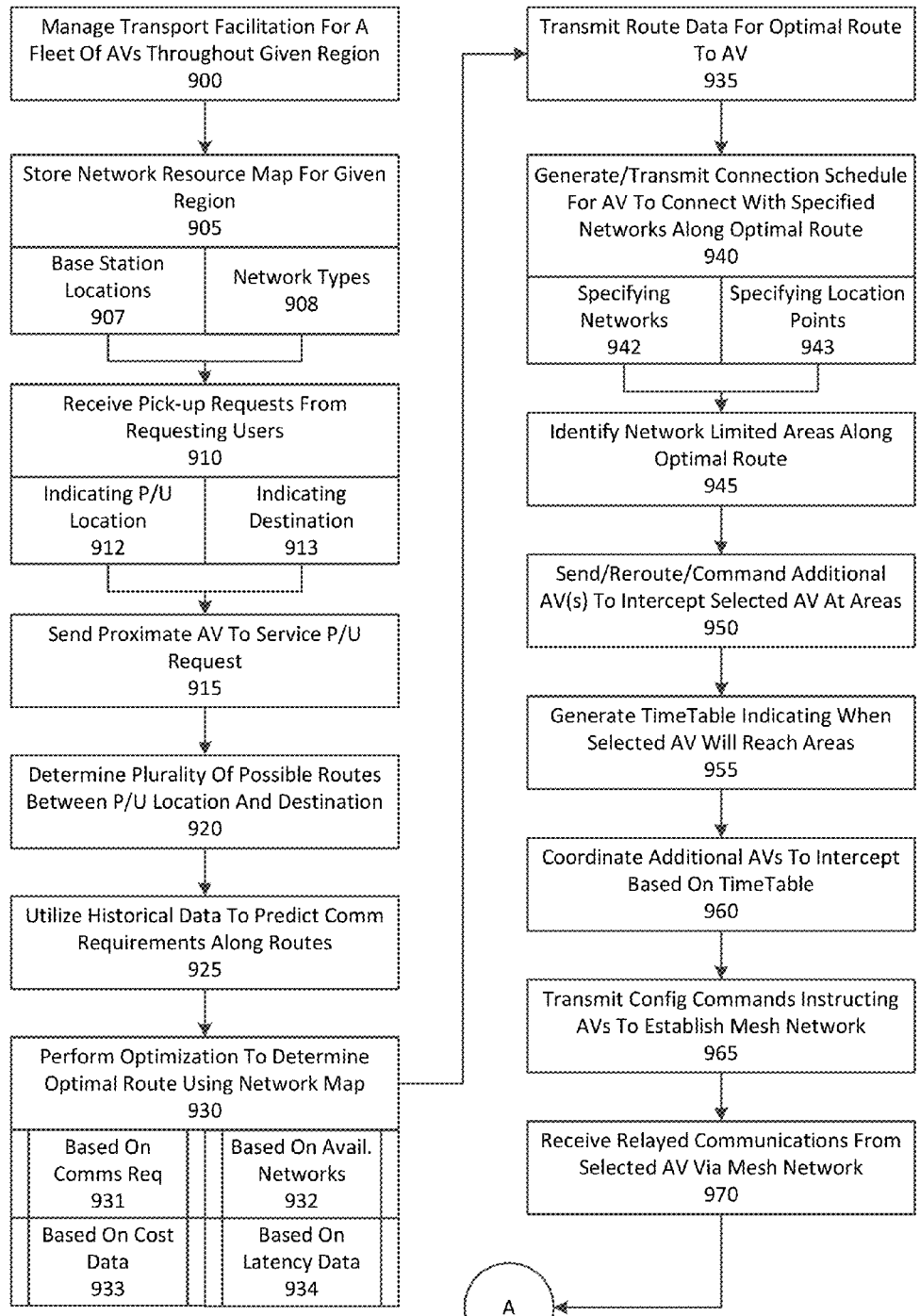
FIGS. 9A and 9B are flow charts describing an example method of selecting optimal routes and connections for AVs throughout a given region.
Figure 9B:
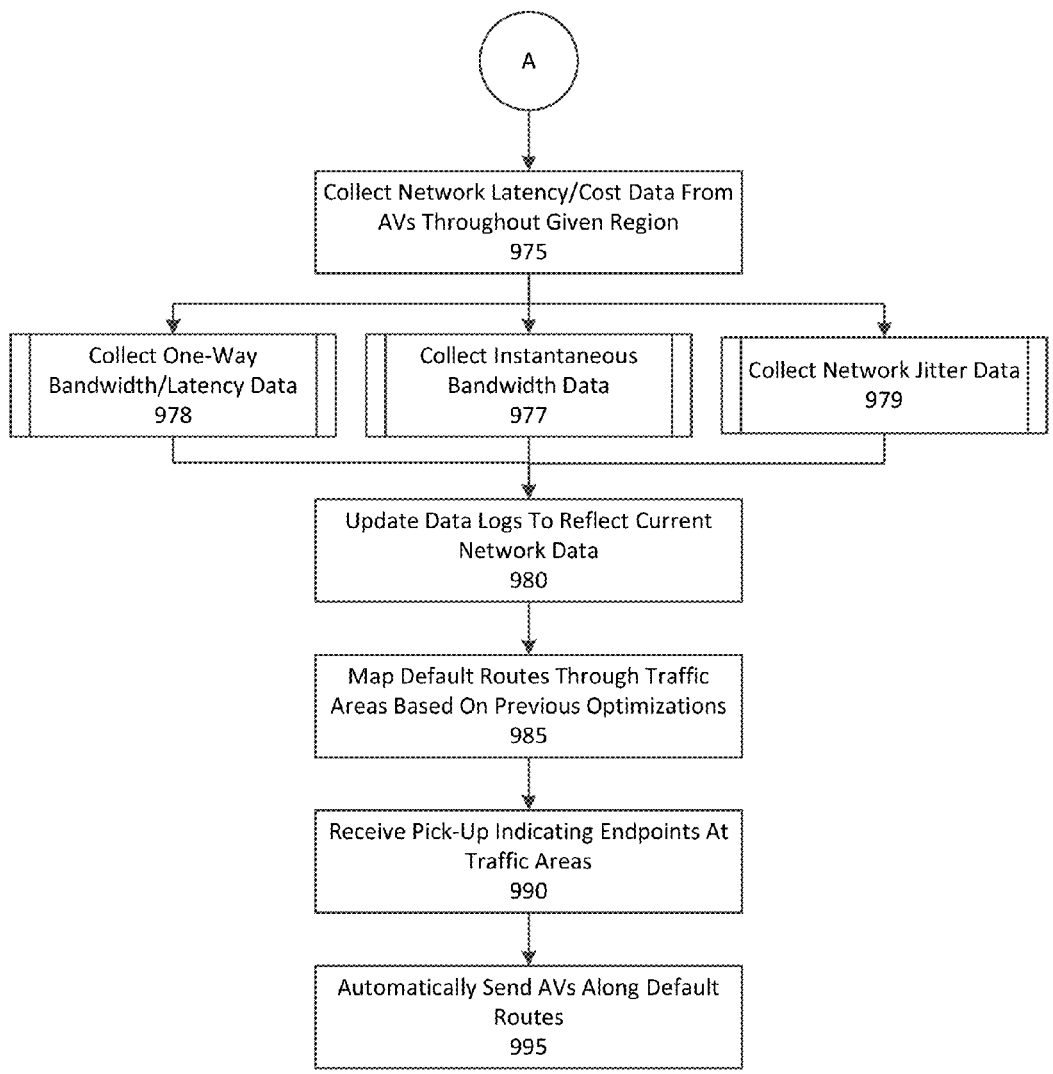

FIGS. 9A and 9B are flow charts describing an example method of selecting optimal routes and connections for AVs throughout a given region. In the below description of FIGS. 9A and 9B, reference may be made to like reference characters representing various features of FIG. 3 for illustrative purposes. Furthermore, the method described in connection with FIGS. 9A and 9B may be performed by an example backend system 300 as described with respect to FIG. 3. Referring to FIG. 9A, the backend system 300 can manage transportation facilitation for a fleet of AVs throughout a given region (900). Furthermore, the backend system 300 can store a network resource map 332 (905) that indicates base station locations (907), available networks/network types (908), and coverage areas for the available networks. The network resource map 332 and/or network logs stored in the database 330 can include additional information about the available networks, such as current network latency data and cost data.

In many implementations, the backend system 300 can receive pick-up requests 387 from requesting users operating user devices 385, such as smart phones, tablet computers, personal computers, and the like (910). Each of the pick-up requests 387 can indicate a pick-up location 317 anywhere in the given region (912), and can indicate a destination 319 (913)—also anywhere in the given region. In response to the pick-up request 387, the backend system 300 can identify proximate AVs in relation to the pick-up location 317, and instruct an AV to pick-up the requesting user (915).

According to examples described herein, the backend system 300 can utilize map data 343 and the network resource map 332 to determine a number of possible routes 367 between the pick-up location 317 and the destination 319 (920). Further, the backend system 300 can utilize historical network and communications data 335 to predict communication requirements for the selected AV for each of the possible routes 367 (925). The backend system 300 may then perform an optimization operation to determine an optimal route for the AV between the pick-up location 317 and the destination 319 (930). The optimization can include various parameters, such as the predicted communications requirements based on historical data 335 (931), the available networks/base stations along the route options 367 (932), the current cost data for transmitting data over those networks (933), and the current network latency of those networks (934). Accordingly, the optimization operation can result in an optimal route that includes networks that provide the necessary bandwidth to transmit the projected communications at a lowest predictable cost.

Thereafter, the backend system 300 can transmit route data for the optimal route 363 to the selected AV (935) over a current network. Furthermore, as provided herein, the backend system 300 can also generate and transmit a connection schedule 364 for the selected AV to connect with the specified networks determined from the optimization (940). As further provided herein, the connection schedule 364 can specify the particular networks (942) and also location points at which the selected AV is to connect with the specified networks (943).

As part of the optimization, the backend system 300 can further identify network-limited areas along each of the possible routes 367 and ultimately select an optimal route 363 that passes through one or more network limited areas (945). As provided herein, the backend system can send out, reroute, alter control commands, or otherwise command proximate AVs to intercept the selected AV in order to establish a mesh network while the selected AV travels through the one or more network-limited areas (950). In some aspects, the backend system 300 can generate a timetable indicating when the selected AV will reach the network limited area(s) (955), and coordinate the additional AVs to establish the mesh network with the selected AV in accordance with the timetable (965).

Once the selected AV and the additional AV(s) are coordinated, the backend system 300 can transmit network configuration commands instructing the AVs to establish a mesh network while the selected AV travels through the network limited area (965). In variations, the backend system 300 can incorporate additional AVs on an as-needed basis to maintain the mesh network. Furthermore, the communications from the off-network, selected AV can be relayed through any number of AVs, and hopped to different base stations over different channels dynamically. Thus, the optimization and connection schedule 364 can instruct the additional AVs to connect, disconnect, and/or hand off communications with the off-network AV dynamically. Accordingly, while the selected AV is traveling within the network-limited area, the backend system 300 can receive communications from the selected AV via the established mesh network(s) (970).

Referring to FIG. 9B, the backend system 300 can also collect network latency data and cost data from the fleet of AVs 390 as they travel throughout the given region (975). Further, the backend system 300 can collect data indicating one-way bandwidth and/or latency between the AVs 390 and the backend system 300 (978). In certain implementations, the backend system 300 can also collect instantaneous bandwidth data 977 from the fleet of AVs 390 (977). And in still further implementations, the backend system 300 can collect network jitter data indicating variations in the delay of received data packets (979).

Utilizing some or all of the foregoing collecting data, the backend system 300 can update data logs to reflect the current network landscape of the given region, and thus maintain an up-to-date, real-time network resource map 332 (980). In certain scenarios, the optimization described herein may yield similar results for specified routes (e.g., routes between a downtown area and a local airport). Along these lines, certain frequented routes may utilize the same networks with the same connection schedule 364. In such scenarios, the backend system 300 can map default routes through these traffic areas based on the previous optimizations (985). The default routes may be refreshed or recalculated after a period of time (e.g., every day). Accordingly, after a certain number of optimizations for similar endpoints achieve the same or similar connection schedule 364, the backend system 300 can automatically set default routes for the given period of time. Thereafter, the backend system 300 can receive pick-up requests 387 indicating those similar endpoints 353 (990), and automatically instruct and send a proximate AV to service the pick-up request 387 along the default route for those endpoints 353 (995).

FIGS. 10A and 10B are flow charts describing example methods of channel selection and routing as performed by an example AV, as described herein. In the below description of FIGS. 10A and 10B, reference may be made to like reference characters representing various features of FIGS. 1-3 for illustrative purposes. Furthermore, the method described in connection with FIGS. 10A and 10B may be performed by an example AV 100 as described with respect to FIG. 1, or the AV 200 shown and described with respect to FIG. 2. Referring to FIG. 10A, the AV 200 itself can utilize a network resource map 237 to select optimal networks to communication with a central transportation management system (e.g., the backend system 300 of FIG. 3). As described herein, the stored network resource map 237 can comprise a spectrum heat map indicating various base station locations, available networks/network types, coverage areas, and/or approximated visualizations of bandwidth gradients from each available network in the given region.

In certain implementations, the AV 200 can select optimal networks dynamically as the AV 200 travels throughout the given region. The AV 200 can be directed by the backend system 300 to perform any number of tasks by, for example, instructing the AV 200 to deliver commerce items and/or transport passengers by servicing pick-up requests, as described herein. As such, the AV 200 can operate as a point-to-point transport traveling from current locations to destinations (e.g., pick-up locations, inputted destinations, delivery locations, etc.). For each particular "trip" (i.e., an instruction from the backend system 300 to drive from a current location to a certain destination), the AV 200 can select optimal networks utilizing the network resource map 237 prior to route initialization (1001), or dynamically as the AV 200 drives to each destination (1003).

Furthermore, the AV 200 can select optimal networks to communicate with the central transportation management system for a particular route based on communications requirements along the route (1004), based on the available networks along the route (1005), based on costs associated with connecting with and transmitting data over each available network (1007), and based on network latency data for each of the available networks (1009). These data can be stored by the AV 200 itself and updated periodically by, for example, receiving network updates from the backend system 300. Accordingly, prior to or while the AV 200 travels to a particular destination, the AV 200 can utilize the updated network resource map 237 to plan optimal routes and/or dynamically configure its communications array 245 to connect with the optimal networks along the traveled routes (1010).

Dynamic configuration of the communications array 245 can include configuring a plurality of dedicated antennas for dedicated communications protocols (1011). For example, the communications array 245 can include dedicated antennas for any number of the following communications protocols: 3G, 4G, 4G LTE, DSRC, unlicensed 900 MHz bands, WiGig, WiMax, WiFi, and the like. When optimal networks are selected by the AV 200, the AV 200 can configure an on-board communication system 235 to initialize the corresponding dedicated antenna(s) in order to connect with the optimal network(s) and transmit and receive data over the optimal network(s). Accordingly, the communications system 235 can select the specified communication channels utilizing the dedicated antennas to transmit and receive data over the selected optimal networks (1013).

Additionally or alternatively, the communications array 245 of the AV 200 can include a tunable antenna 104, and thus the on-board communication system 235 can configure the tunable antenna to transmit and receive data over the selected optimal network(s) (1015). Additionally or alternatively still, the communications array 245 of the AV 200 can include a phased array, and thus the on-board communication system 235 can configure the phased array to transmit and receive data over the selected optimal network(s) (1017). For example including a tunable antenna and/or a phased array, the communication system 235 can dynamically configure the tunable antenna and/or phased array as the AV 200 travels throughout the given region. When a next optimal network coverage area approaches, the communication system 235 can select and transmit voltage signals to specified configuration points or nodes of the tunable antenna and/or phased array in order to adjust a resonance and radiation pattern associated with the next optimal network (1019).

In many aspects, the AV 200 can receive a transport command from a central transportation management system to drive to a particular location to perform a task, such as servicing a pick-up request (1020). Accordingly, the AV 200 can process the transport command and drive to the location (1025). Processing the transport command can comprise identifying the location on map content 226 provide by, for example, a mapping engine 275 of the AV 200. In order to travel to the location (e.g., a pick-up location or destination), the AV 200 can process sensor data 207 from an on-board sensor array 205 that continuously detects a surrounding environment of the AV 200. Sensor data processing can be performed by an on-board data processing system 210 of the AV 200 by accessing sub-maps 233 of the given region and continuously comparing the sub-maps 233 to the sensor data 207 to, for example, react to pedestrians or road traffic along the route (1030).

In certain examples, the sub-maps 233 are compiled by other vehicles or AVs traveling throughout the given region that include sub-map 233 recording equipment, such as radar and/or LiDAR equipment, stereo camera equipment, proximity sensor equipment, and the like. In some cases, the sub-maps 233 can comprise 3D LiDAR-based sub-maps of the given region that include three-dimensional surface data collected for all or nearly all surface roads of the given region. In these cases, the AV's 200 on-board data processing system 210 can, as the AV 200 travels, dynamically compare the sensor data 207 with the stored 3D LiDAR-based sub-maps 233 to operate the acceleration, braking, and steering systems 25 of the AV 200 to maneuver through road traffic to the location (1033).

At any given time, the AV 200 can perform a localization operation using the sensor data 207 and the sub-maps 233 (1035). This localization operation can be performed as the AV 200 travels, or when the AV 200 is stationary, such as when the AV 200 is parked or stopped at a stoplight. In performing the localization operation, the AV 200 can compare the sensor data 207 to various features of the sub-maps 233 in order to (i) determine a specific location of the AV 200 within the given region (1037), and (ii) determine the orientation of the AV 200 at that specific location (1039).

Localization may be necessary for the AV 200 to determine and react to various aspects of traveling in normal road traffic throughout the given region. For example, sub-map data may have been collect in an lane adjacent to which the AV 200 is current traveling. Localization can enable the AV 200 to recognize this fact, and dynamically compensate for the sensor data 207 processing by, for example, performing image warping on the sub-maps 233 and/or the sensor data 207 and maintain awareness of potential risks and hazards along a particular route.

Localization can further be utilized by the AV 200 for communications. According to examples described herein, the AV 200 can utilize the location and orientation of the AV 200 in order to perform ray tracing operations to identify proximate base stations and available networks (1040). For example, the AV 200 can utilize the network resource map 237 to identify base station locations proximate to the AV 200, and perform the ray tracing operations from the current location and based on the AV's 200 orientation. The ray tracing operations can project line-of-sight vectors from the communications array 245 of the AV 200 to each proximate base station to identify an optimal base station through which the AV 200 can transmit and receive communications with the backend system 300. Data from such operations can be shared with the backend system 300 or other AVs (e.g., for establishing mesh networks and relaying communications to optimal base stations) in order to optimize total system bandwidth of the given region.

Referring to FIG. 10B, the on-board AV control system 220 can operate the operative systems 225 of the AV 200 (e.g., the acceleration, braking, and steering systems) to drive the AV 200 along a particular route (1050). For example, the AV 200 can travel along a route to a particular location or destination. Prior to or while traveling along the route, the AV can receive network configuration commands from the backend system 300 to connect with a number of active networks along the route. (1055). In some examples, the network configuration commands can be included in a connection schedule generated by the backend system 300 as the result of an optimization operation, and received prior to initializing the route or during route travel (1057).

Based on the network configuration commands and/or utilizing the connection schedule, the AV 200 can configure the communications array 245 to transmit and receive communications 252 over the channels specified (1060). As described herein, the communication system 235 can configure the communications array 245 by configuring dedicated antennas (1061), selected the specified channels (1063), configuring a tunable antenna (1065), and/or configuring a phased array (1067). As further described herein, configuring the communications array 245 can be performed dynamically as the AV 200 travels through and between networks.

In many examples, the AV 200 can receive a transport command from the backend system 300 indicating a location, such as a pick-up location or destination (1070). In response, the AV 200 can process the transport command, as described above, and drive to the location (1075). Furthermore, at any given time, the AV 200 can receive route data from the backend system 300 indicating an optimal route to travel to the location, or between the endpoints of a pick-up request (e.g., the pick-up location and destination) (1080). As further discussed herein, the AV 200 can travel along the optimal route by continuously processing sensor data 207 utilizing stored sub-maps 233 (e.g., LiDAR-based surface maps of the given region) to identify and react to road traffic and potential hazards (1082).

While traveling throughout the given region, the AV 200 can collect network data such as cost data and network latency data for the networks with which the AV 200 connects. In order to maintain an updated network resource map 237, the AV 200, along with other AVs throughout the given region, can transmit the updated network data to the backend system 300 to enable the backend system 300 to update network logs and provide updated data to the other AVs in the fleet (1085). As provided herein, the network updates can include transmission cost data for each of the connected networks (1087), and network latency data corresponding to transmission delays for each of the connected networks (1089).

Figure 11:
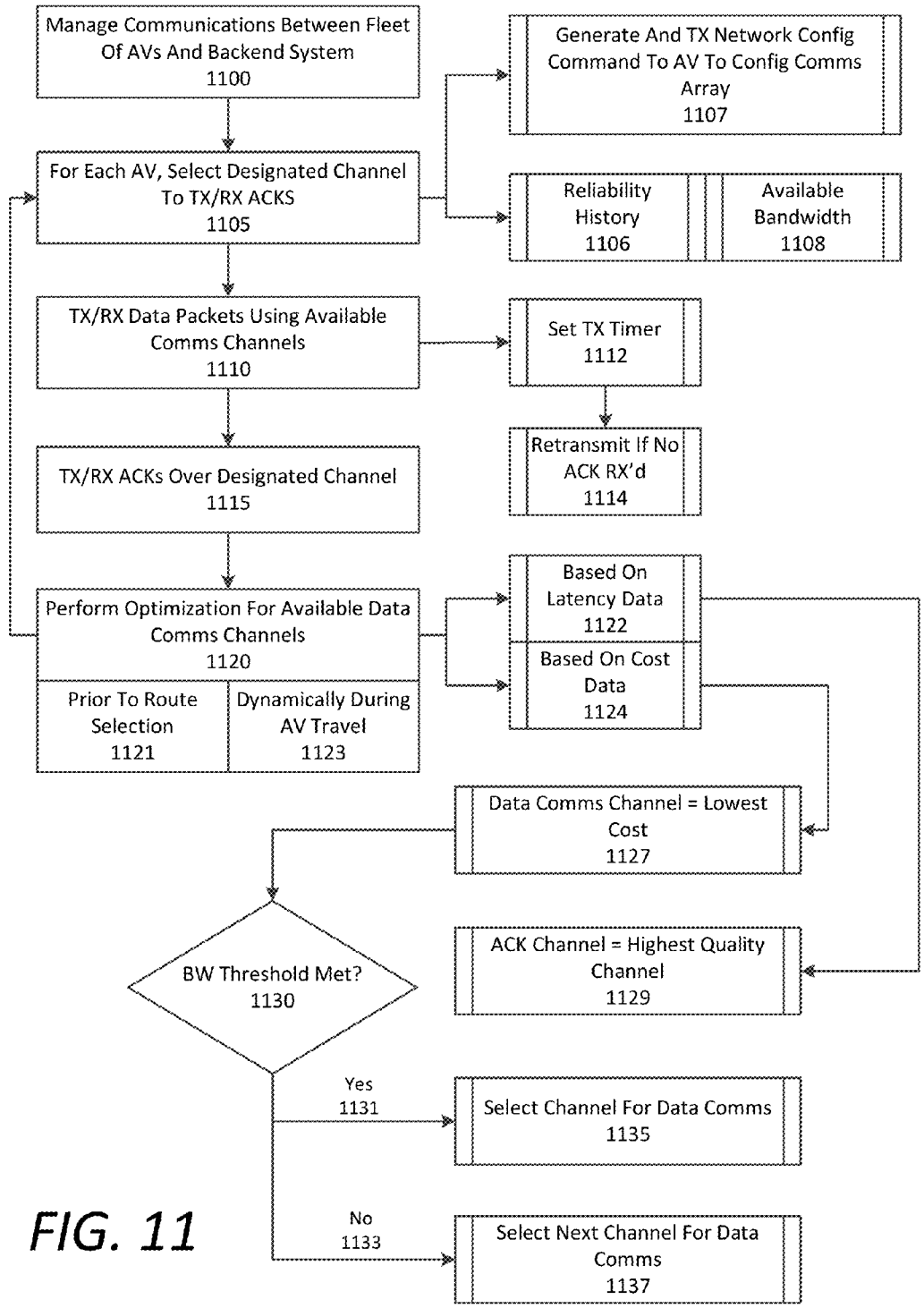
FIG. 11 is a flow chart describing an example method of selecting designated channels for specified communications.

FIG. 11 is a flow chart describing an example method of selecting designated channels for specified communications. In the below description of FIG. 11, reference may be made to like reference characters representing various features of FIGS. 3 and 5 for illustrative purposes. Furthermore, the method described in connection with FIG. 11 may be performed by an example backend system 300 implementing an AV tracking and updating system 500 as described with respect to FIGS. 3 and 5. Referring to FIG. 11, the AV tracking and updating system 500 can manage communications between a fleet of AVs 590 and a backend system 300 (1100). In many examples, the backend system 300 can communicate with the AVs 590 using a transmission control protocol (TCP), in which each delivery of a data packet or communication is confirmed with a transmission acknowledgement (ACK), which can be vital to maintain reliable and efficient communications. For each respective AV in the fleet, the AV tracking and updating system 500 can select a designated channel to transmit and receive ACKs (1105). In variations, the communications between the backend system 300 and the AVs 590 can utilize a mixture of TCP (for reliable connections) and user datagram protocol (UDP) (e.g., for lowest latency and optimal performance).

Accordingly, the AV tracking and updating system 500 can generate and transmit a network configuration command to a respective AV to configure its communications system to transmit and receive ACKs over the designated channel (1107). In many examples, the designated channel can be different from channels used for data communications. As such, the designated channel can be a more reliable and/or more expensive channel (1106), or can have a history of having plenty of available bandwidth (1108) in order to ensure prompt transmission of ACKs. The AV tracking and updating system 500 can track the AV locations 573 or routes and consult the network resource map 532 to identify specified channels along such routes that are suitable for ACKs. Thus, the AV tracking and updating system 500 can transmit configuration commands to switch to designated ACK channels as the AV travels between networks.

On the other hand, the AVs 590 and the backend system 300 can transmit and receive normal communications 597 (e.g., data packets) over channels selected via the optimization operation performed by the backend system 300 (1110). For each transmitted data packet, the AV tracking and updating system 500 can initiate or set a timer for a period of time (1112). If no ACK is received at the end of the time period (e.g., 1-2 seconds), the AV tracking and updating system 500 can retransmit the data packet to the respective AV (1114) over the same channel. At the same time, the AV tracking and updating system 500 can transmit ACKs to the AV over the designated ACK channel (1115).

In some examples, if a predetermined number of failed transmissions have occurred for a single data packet, the AV tracking and updating system 500 can transmit that data packet over the designated, more reliable channel, depending on the type of communication. For example, if the data packet is a high-priority communication, such as a reroute or transport command, then the AV tracking and updating system 500 can transmit the data packet over the designated ACK channel. However, if the data packet is a low priority communication, then the AV tracking and updating system 500 can cache (or discard) the transmission until the AV connects with more reliable data networks.

As such, the AV tracking and updating system 500 can perform optimizations of available networks to determine optimal channels to transmit different types of communications (1120). This optimization can be performed prior to selecting an optimal route by the backend system 300 (1121), or dynamically as the AV travels throughout the given region (1123). Furthermore, each specified channel (e.g., high bandwidth/high cost to low bandwidth/low cost channels) can be selected for certain types of communications (e.g., high priority communications, such as ACKs, to low priority communications, such as network updates). As described, the channels for communications can be selected based on network latency data 536 (1122) and cost data 534 (1124). For example, low priority or regular communications can be transmitted over lower cost and higher latency networks (e.g., lowest cost networks) (1127), whereas high priority communications (e.g., ACKs) can be transmitted over higher cost, lower/lowest latency networks (e.g., a highest quality network) (1129).

As an example, the AV tracking and updating system 500 can identify a plurality of networks available on a route segment along an optimal route traveled by the AV. The AV tracking and updating system can readily select the highest quality network (e.g., based on historical data) for transmitting and receiving ACKs. For data communications, the AV tracking and updating system 500 can identify available networks, and determine whether a minimum bandwidth threshold is met for each respective communication type (1130). For example, while certain available networks may have sufficient bandwidth to transmit location data, they may not be sufficient for streaming audio or video content. Accordingly, the AV tracking and updating system 500 can select these networks for transmitting and receiving location data, and select a higher bandwidth network for streaming audio or video content.

For certain communication types, the AV tracking and updating system 500 can determine that a particular available network does not meet a bandwidth threshold (1133), and therefore select a next channel, or a channel that meets a minimum bandwidth requirement for the specified data communications (1137). Conversely, if a particular network does meet the bandwidth threshold for certain data communications (1131), then the AV tracking and updating system 500 can select that network for transmitting those data communications (1135).

Hardware Diagrams

Figure 12:
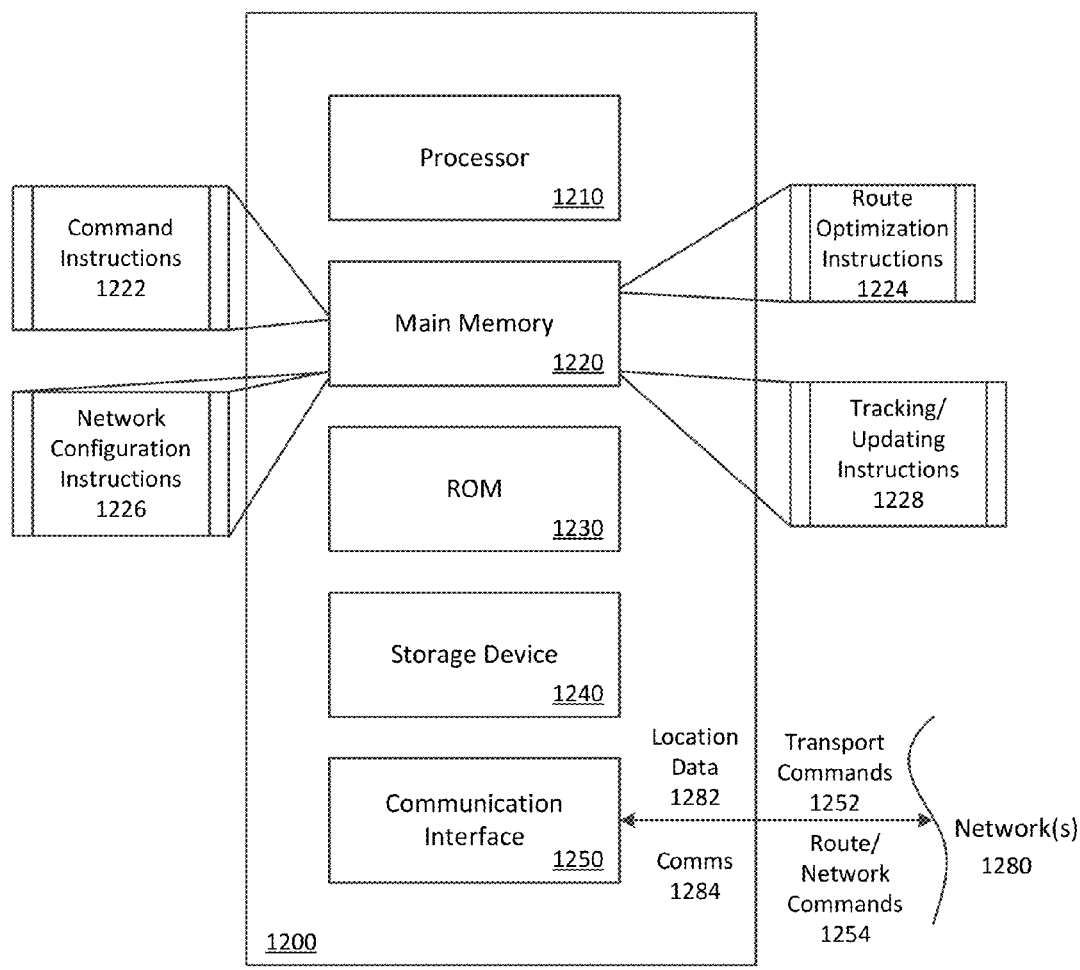
FIG. 12 is a block diagram that illustrates a computer system upon which example backend systems and AV tracking and updating systems described herein may be implemented.

FIG. 12 is a block diagram that illustrates a computer system upon which example backend systems 300 and AV tracking and updating systems 500 described herein may be implemented. A computer system 1200 can be implemented on, for example, a server or combination of servers. For example, the computer system 1200 may be implemented as part of the backend system 300 as shown and described with respect to FIG. 3, and/or the AV tracking and updating system 500 shown and described with respect to FIG. 5. Furthermore, in the context of FIG. 3, the backend system 300 and the AV tracking and updating system 500 may be implemented using an example computer system 1200 such as described by FIG. 12. The backend system 300 and the AV tracking and updating system 500 may also be implemented using a standalone system or a combination of multiple computer systems as described in connection with FIG. 12.

In one implementation, the computer system 1200 includes processing resources 1210, a main memory 1220, a read-only memory (ROM) 1230, a storage device 1240, and a communication interface 1250. The computer system 1200 includes at least one processor 1210 for processing information stored in the main memory 1220, such as provided by a random access memory (RAM) or other dynamic storage device, for storing information and instructions which are executable by the processor 1210. The main memory 1220 also may be used for storing temporary variables or other intermediate information during execution of instructions to be executed by the processor 1210. The computer system 1200 may also include the ROM 1230 or other static storage device for storing static information and instructions for the processor 1210. A storage device 1240, such as a magnetic disk or optical disk, is provided for storing information and instructions.

The communication interface 1250 enables the computer system 1200 to communicate with the fleet of AVs over one or more networks 1280 through use of wireless electronic links or a wired interface such as an internal and/or external bus. Using the electronic link, the computer system 1200 can communicate with the AVs, such as the AVs 390, 590, as shown an described in connection with FIGS. 3 and 5. In accordance with examples, the computer system 1200 receives location data 1282 and other communications 1284 from the AVs 390, 590 over the network(s) 1280. The executable instructions stored in the memory 1230 can include command instructions 1222, which the processor 1210 executes to select and send out respective AVs throughout the given region to perform certain tasks, such as service respective pick-up requests.

The executable instructions stored in the memory 1220 can also include route optimization instructions 1224, which enable the computer system 1200 to optimize routes traveled by the AVs based on communication requirements, available networks, and base station locations. Furthermore, the executable instructions can include tracking and updating instructions 1228, which the processor 1210 can execute to track the locations of AVs 390, 590 throughout the given region, update network resource maps 532 based on received network updates, and provide route updates to the AVs 390, 590. Still further, the executable instructions in the main memory 1220 can include network configuration instructions 1226, which the processor 1210 can execute to perform dynamic network optimizations as the AVs 390, 590 travel and provide updated network configuration commands to enable the AVs 390, 590 to configure their communications systems and connect to optimal networks accordingly. By way of example, the instructions and data stored in the memory 1220 can be executed by the processor 1210 to implement an example backend system 300 of FIG. 3, and/or and AV tracking and updating system 500 shown and described with respect to FIG. 5. In performing the operations, the processor 1210 can receive location data 1282 and communications 1284, and generate and transmit transport commands 1252 and route/network configuration commands 1254 to manage communications and instructions for facilitating transportation for a fleet of AVs 390, 590.

The processor 1210 is configured with software and/or other logic to perform one or more processes, steps and other functions described with implementations, such as described in connection with FIGS. 1-11, and elsewhere in the present application.

Figure 13:
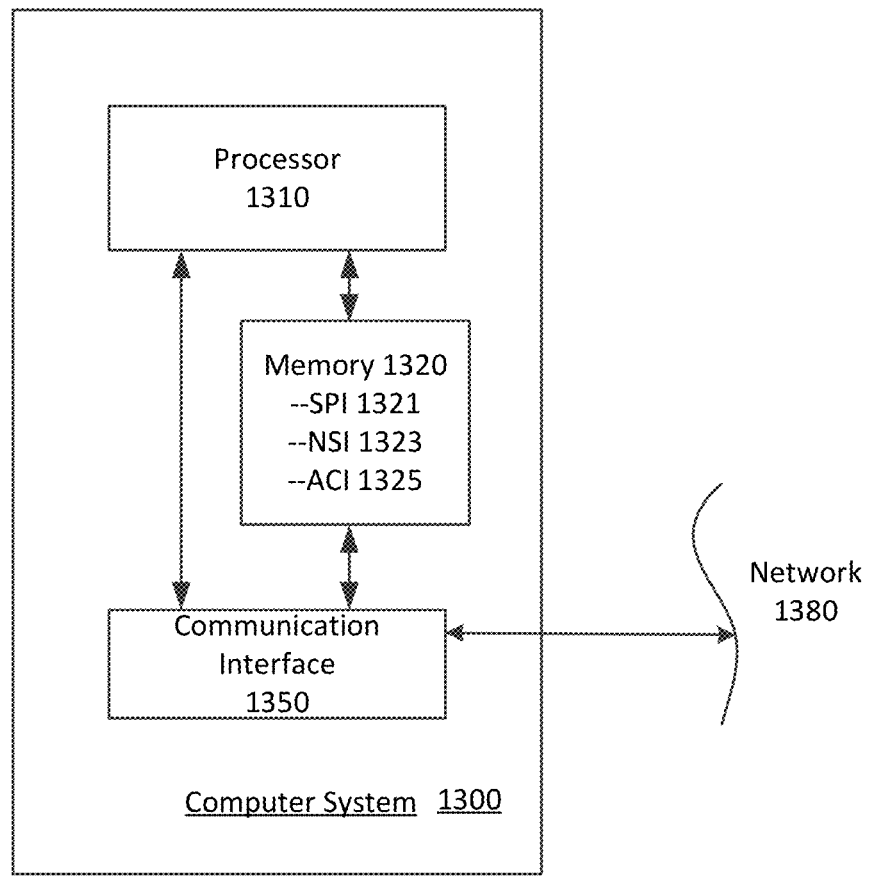
FIG. 13 is a block diagram that illustrates a computer system upon which example AV systems described herein may be implemented.

FIG. 13 is a block diagram that illustrates a computer system 1300 upon which example AV systems described herein may be implemented. For example, the computer system 1300 may be implemented as part of an on-board data processing system 210 and/or AV control system 220 of an AV 200, as shown and described with respect to FIG. 2. As such, any of the example systems described with respect to the AV 200 can be implemented using a single computer system 1300 or a combination of multiple computer systems 1300 as described by FIG. 13.

In one implementation, the computer system 1300 includes processing resources 1310, memory resources 1320 (including a read-only memory (ROM) and/or a storage device), and a communication interface 1350. The computer system 1300 includes at least one processor 1310 for processing information stored in memory resources 1320. The memory resources 1320 include a main memory component, random access memory (RAM) and/or other dynamic storage device, for storing information and instructions which are executable by the processor 1310. The memory resources 1320 also may be used for storing temporary variables or other intermediate information during execution of instructions to be executed by the processor 1310. The memory resources 1320 can use ROM or other static storage device for storing static information and instructions for the processor 1310. A storage device, such as a magnetic disk or optical disk, is provided for storing information and instructions.

The communication interface 1350 enables the computer system 1300 to communicate with one or more networks 1380 (e.g., cellular network) through use of the network link (wireless or a wire). Using the network link, the computer system 1300 can communicate with a backend system 300, as described with respect to FIG. 3. In accordance with examples, the computer system 1300 receives transport commands and processes sensor data 207 and sub-maps 233 in order to drive the AV 200 to a location (e.g., a destination). The executable instructions stored in the memory 1320 can include (i) sensor processing instructions 1321 for maneuvering the AV 200 through road traffic using sub-maps 233 ("SPI 1321"), (ii) network selection instructions 1323 for processing network configuration commands or a connection schedule in order to select specified channels at specified location points along a particular route ("NSI 1323"), and (iii) array configuration instructions 1325 for generating and transmitting voltage signals to the communications array 245 to transmit and receive data over the selected channels ("ACI 1325").

Examples described herein are related to the use of the computer systems 1200, 1300 for implementing the techniques described herein. According to one example, those techniques are performed by the computer systems 1200, 1300 in response to processors 1210, 1310 executing one or more sequences of one or more instructions contained in the main memories 1220, 1320. Such instructions may be read into the main memories 1220, 1320 from another machine-readable medium, such as a storage device 1240. Execution of the sequences of instructions contained in the main memories 1220, 1320 cause the processors 1210, 1310 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A system for communicating with a plurality of autonomous vehicles (AVs) operating throughout a given region, the system comprising:
   one or more processors; and
   one or more memory resources storing instructions that, when executed by the one or more processors, cause the system to:
   store a spectrum heat map in the one or more memory resources, the spectrum heat map indicating network coverage strength for available networks throughout the given region;
   identify a travel route for a selected one of the plurality of AVs;
   using the spectrum heat map, determine a connection schedule for the selected AV, the connection schedule indicating location points along the travel route at which the selected AV is to switch from previous network connections to succeeding network connections; and
   transmit the connection schedule to the selected AV to enable the selected AV to switch network connections at the location points along the travel route;
   wherein the executed instructions cause the system to further determine the connection schedule by identifying, using the spectrum heat map, a string of networks along the travel route, wherein each network in the string of networks represents a network having a highest bandwidth among respective available networks at a corresponding location point of the location points along the travel route.

2. The system of claim 1, wherein the networks indicated on the spectrum heat map comprise one or more of a 3G, a 4G, a long-term evolution (LTE), or a WiFi network.

3. The system of claim 1, wherein the networks indicated on the spectrum heat map comprise one or more of a WiMax, a WiGig, or a dedicated short range communications (DSRC) network.

4. The system of claim 1, wherein the networks indicated on the spectrum heat map comprise a 900 MHz band network.

5. The system of claim 1, wherein the executed instructions further cause the system to:
   receive a pick-up request from a requesting user in the given region;

in response to receiving the pick-up request, identify that the selected AV is proximate to a pick-up location identified in the pick-up request; and
instruct the selected AV to travel to the pick-up location to service the pick-up request.

6. The system of claim 5, wherein the pick-up request further includes a destination, and wherein the travel route comprises a route from the pick-up location to the destination.

7. The system of claim 1, wherein the executed instructions further cause the system to:
receive network quality data for each of the networks from the plurality of AVs traveling throughout the given region; and
dynamically update the spectrum heat map based on the received network quality data.

8. A computer-implemented method for managing network connections for a plurality of autonomous vehicles (AVs) operating throughout a given region, the method being performed by one or more processors and comprising:
storing a spectrum heat map indicating network coverage strength for networks throughout the given region;
identifying a travel route for a selected one of the plurality of AVs;
using the spectrum heat map, determining a connection schedule for the selected AV, the connection schedule indicating location points along the travel route at which the selected AV is to switch from previous network connections to succeeding network connections; and
transmitting the connection schedule to the selected AV to enable the selected AV to switch connections at the location points along the travel route;
wherein determining the connection schedule comprises identifying, using the spectrum heat map, a string of networks along the travel route, wherein each network in the string of networks represents a network having a highest bandwidth among respective available networks at a corresponding location point of the location points along the travel route.

9. The method of claim 8, wherein the networks indicated on the spectrum heat map comprise one or more of a 3G, a 4G, a long-term evolution (LTE), or a WiFi network.

10. The method of claim 8, wherein the networks indicated on the spectrum heat map comprise one or more of a WiMax, a WiGig, or a dedicated short range communications (DSRC) network.

11. The method of claim 8, wherein the networks indicated on the spectrum heat map comprise a 900 MHz band network.

12. The method of claim 8, further comprising:
receiving a pick-up request from a requesting user in the given region;
in response to receiving the pick-up request, identifying that the selected AV is proximate to a pick-up location identified in the pick-up request; and
instructing the selected AV to travel to the pick-up location to service the pick-up request.

13. The method of claim 12, wherein the pick-up request further includes a destination, and wherein the travel route comprises a route from the pick-up location to the destination.

14. The method of claim 8, further comprising:
receiving network quality data for each of the networks from the plurality of AVs traveling throughout the given region; and
dynamically updating the spectrum heat map based on the received network quality data.

15. A non-transitory computer readable medium storing instructions that, when executed by one or more processors, cause the one or more processors to:
store a spectrum heat map indicating network coverage strength for networks throughout a given region;
identify a travel route for a selected one of a plurality of AVs operating throughout the given region;
using the spectrum heat map, determine a connection schedule for the selected AV, the connection schedule indicating location points along the travel route at which the selected AV is to switch from previous network connections to succeeding network connections; and
transmit the connection schedule to the selected AV to enable the selected AV to switch connections at the location points along the travel route;
wherein the executed instructions cause the one or more processors to further determine the connection schedule by identifying, using the spectrum heat map, a string of networks along the travel route, wherein each network in the string of networks represents a network having a highest bandwidth among respective available networks at a corresponding location point of the location points along the travel route.

16. The non-transitory computer readable medium of claim 15, wherein the networks indicated on the spectrum heat map comprise one or more of a 3G, 4G, long-term evolution (LTE), WiFi, WiMax, WiGig, dedicated short range communications (DSRC), or a 900 MHz band network.

17. The non-transitory computer readable medium of claim 15, wherein the executed instructions further cause the one or more processors to:
receive network quality data for each of the networks from the plurality of AVs traveling throughout the given region; and
dynamically update the spectrum heat map based on the received network quality data.

* * * * *